United States Patent
Byun et al.

(10) Patent No.: US 8,736,573 B2
(45) Date of Patent: May 27, 2014

(54) METHOD AND APPARATUS COMPENSATING NOISE IN TOUCH PANEL

(75) Inventors: San-ho Byun, Bucheon (KR); Yoon-kyung Choi, Yongin-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 594 days.

(21) Appl. No.: 13/013,308

(22) Filed: Jan. 25, 2011

(65) Prior Publication Data

US 2011/0193817 A1   Aug. 11, 2011

(30) Foreign Application Priority Data

Feb. 5, 2010   (KR) .................. 10-2010-0011190

(51) Int. Cl.
  *G06F 3/045*   (2006.01)
  *G06F 3/044*   (2006.01)
  *G06F 3/041*   (2006.01)

(52) U.S. Cl.
  CPC ............. *G06F 3/044* (2013.01); *G06F 3/045* (2013.01); *G06F 3/0412* (2013.01); *G06F 3/0416* (2013.01)
  USPC ...................................... 345/174

(58) Field of Classification Search
  None
  See application file for complete search history.

(56) References Cited

U.S. PATENT DOCUMENTS

| | | | | |
|---|---|---|---|---|
| 5,475,337 A | * | 12/1995 | Tatsumi | 327/551 |
| 2008/0158175 A1 | * | 7/2008 | Hotelling et al. | 345/173 |
| 2008/0158184 A1 | * | 7/2008 | Land et al. | 345/173 |
| 2008/0165134 A1 | * | 7/2008 | Krah | 345/173 |
| 2010/0060610 A1 | * | 3/2010 | Wu | 345/174 |
| 2010/0214253 A1 | * | 8/2010 | Wu et al. | 345/174 |
| 2010/0315353 A1 | * | 12/2010 | Huang et al. | 345/173 |

FOREIGN PATENT DOCUMENTS

| | | |
|---|---|---|
| JP | 2007179230 A | 7/2007 |
| KR | 1020060054978 A | 5/2006 |
| KR | 1020090000532 A | 1/2009 |

\* cited by examiner

*Primary Examiner* — Bipin Shalwala
*Assistant Examiner* — Kwie Xie
(74) *Attorney, Agent, or Firm* — Volentine & Whitt, PLLC

(57) ABSTRACT

Touch screen systems and method of compensating noise in same are presented. One touch screen system includes; a touch screen panel having sense channels providing a sense output corresponding to a capacitance variation associated with an applied touch input as detected by one or more sensing units connected to the sense channels. A parasitic capacitance is accumulated in the sense channels as the touch input is applied. The touch screen system also includes a touch controller receiving the sense output and including; a noise compensation block configured to generate a compensation capacitance to compensate for the parasitic capacitance and provide a compensation output, and a signal conversion unit that receives the sense output and the compensation output and generates a noise compensated sense output.

20 Claims, 20 Drawing Sheets

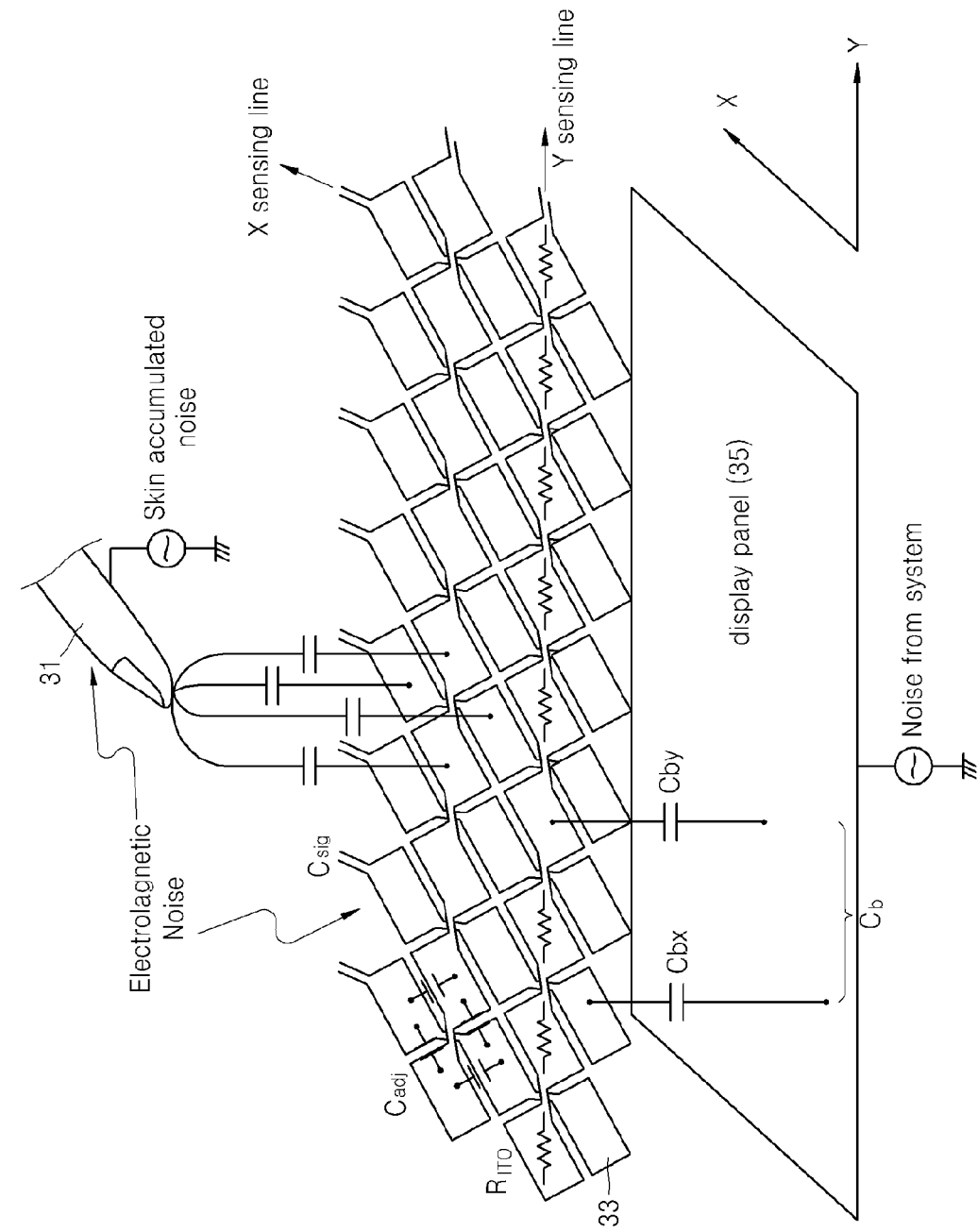

| Window glass |
| Air gap or resin |
| ITO (sensor) |
| Glass |
| Polarizer |
| Top Glass |
| ITO (cathode) |
| OLED |
| Metal (anode) |
| Bottom Glass |

METHOD AND APPARATUS COMPENSATING NOISE IN TOUCH PANEL

CROSS-REFERENCE TO RELATED APPLICATIONS

This application claims the benefit of Korean Patent Application No. 10-2010-0011190 filed on Feb. 5, 2010, in the Korean Intellectual Property Office, the disclosure of which is incorporated herein in its entirety by reference.

BACKGROUND OF THE INVENTION

The inventive concept relates to touch panels, display devices and touch screen systems. More particularly, the inventive concept relates to methods and apparatuses improving the sensitivity and discrimination performance of the touch panels.

Portable electronic devices have become smaller and thinner to meet user demand. Touch screens allowing the omission of mechanical buttons have improved the look and feel of modern electronic devices and enabled appealing design that are widely used in general asynchronous transfer mode (ATM) devices, televisions (TVs), and general home appliances as well as small-sized portable devices. Cell phones, portable multimedia players (PMPs), personal digital assistants (PDAs), e-books, are ready examples of small-sized portable electronic devices that benefit from the incorporation of touch screens. In order to further reduce the physical size and operating complexity of such devices various approaches to the integration of user input interfaces (e.g., input buttons) with a display screen have been explored. As part of this ongoing process of interface-to-screen integration, touch detection (or perception) technology has been the subject of much research and development. "Touch perception" is a broad field of technology that seeks to intelligently and accurately perceive a touch input to a user interface surface, such as a display screen.

Generally, a "touch screen" is a type of visual display which has been further enabled to serve as a user interface. That is a touch screen is an input device that constitutes an interface between an information communication device using a displays and a user. The user directly contacts the touch screen with a "touch mechanism" such as a finger, pen, stylus, or the like in order to input information (e.g., data and/or commands) to the information communication device. Certain types of panel display devices, including liquid crystal display (LCD) devices, field emission display (FED) devices, organic light-emitting diode (OLED) devices, plasma display (PDP) devices, and the like, are commonly used as a touch screen.

Flat panel display devices generally include a plurality of pixels arranged in a row-column matrix to display electronically and/or optically derived images. For example, LCD devices may include a plurality of scan lines that communicate gate signals and a plurality of data lines that communicate gray scale data. Individual pixels are formed at points where a scan line and a data line cross. Each pixel may include a transistor/capacitor combination, or simply a capacitor.

Touch screens use various methods to detect user touch inputs, including resistive overlay, capacitive overlay, surface acoustic wave, infrared, surface elastic wave, inductive, and the like.

In a touch screen using the resistive overlay method, a resistive material is coated on a glass or transparent plastic plate, and a polyester film is covered thereon, and insulating rods are installed at regular intervals so that two sides of the polyester film do not contact each other. In this case, resistance and voltage are varied. However, the position of the user's hand as it contacts the touch screen may erroneously be perceived as an input, or may alter the degree of voltage variation for an intended user input. Touch screens using the resistive overlay method are superior in their performance characteristics when cursive script is input by a user, but they are also characterized by low transmittance, low durability, and problems associated with the detection of multi-contact points.

In a touch screen using the surface acoustic wave method, a transmitter emitting sound waves and a reflector reflecting the sound waves at regular intervals are attached to a one corner of glass display plane. A receiver is attached to the opposite corner of the glass. When the glass is then touched the transmission of the sound waves is interrupted. By determining (or calculating) the point of interruption, the location of the touch input may be perceived.

In a touch screen using the infrared method, the directivity of applied infrared light may be used to perceive the location of a touch input. A matrix may be formed from an arrangement of infrared light-emitting diodes (LEDs) as a spontaneous emission device and a phototransistor as a light receiving device. As with the sound waves in the surface acoustic wave method, a detected interception in the transmission of the infrared light caused by a touch input may be used to determine the location of the touch input.

Contemporary, portable electronic devices mainly use the resistive overlay method which is low cost and is compatible with various input mechanisms. However, as research into user interfaces enabling multiple, simultaneous touch inputs (hereafter, "multi-touch") has continued, touch screens using the capacitive overlay method have become prominent dues to there ability to effectively interpret multi-touch.

SUMMARY OF THE INVENTION

Embodiments of the inventive concept provide touch controllers and methods of operation that reduce the effect of a parasitic capacitance and related noise in a touch screen system.

In one embodiment, the inventive concept provides an apparatus compensating noise in a touch screen system, the apparatus comprising; a touch screen panel including sense channels providing a sense output corresponding to a capacitance variation associated with an applied touch input as detected by one or more sensing units connected to the sense channels, wherein a parasitic capacitance is accumulated as the touch input is applied, and a touch controller receiving the sense output. The touch controller comprises; a noise compensation block configured to generate a compensation capacitance to compensate for the parasitic capacitance and provide a compensation output, and a signal conversion unit configured to receive the sense output and the compensation output, and generates a noise compensated sense output.

In another embodiment, the inventive concept provides a method compensating noise in a touch screen system, the method comprising; sensing a capacitance variation associated with an applied touch input using sensing units connected to multiple sense channels and providing a sense output corresponding to the capacitance variation, wherein a parasitic capacitance is accumulated as the touch input is applied, generating a compensating capacitance to compensate for the parasitic capacitance and a compensation output corresponding to the compensating capacitance, and converting the sense output into a noise compensated sense output using the compensation output.

In another embodiment, the inventive concept provides a touch controller receiving a sense output provided by sense channels sensing a capacitance variation associated with an applied touch input as detected by one or more sensing units connected to the sense channels, wherein a parasitic capacitance is accumulated as the touch input is applied, the touch controller comprising; a noise compensation block configured to generate a compensation capacitance to compensate for the parasitic capacitance and provide a compensation output, and a charge amplifier configured to receive the sense output and the compensation output and generate a noise compensated sense output.

In yet another embodiment, the inventive concept provides a method compensating noise in a touch screen system, the method comprising; sensing a capacitance variation associated with an applied touch input using sensing units connected to multiple sense channels and providing a sense output corresponding to the capacitance variation, wherein a parasitic capacitance is accumulated as the touch input is applied, applying the sense output to one input of a charge amplifier functioning as a signal conversion unit, generating a compensating capacitance to compensate for the parasitic capacitance and generating a compensation output corresponding to the compensating capacitance, applying the compensation output the one input of the charge amplifier, and applying a control voltage to another input of the charge amplifier to generate a noise compensated sense output.

BRIEF DESCRIPTION OF THE DRAWINGS

Exemplary embodiments of the inventive concept will be more clearly understood from the following detailed description taken in conjunction with the accompanying drawings in which:

FIG. 3 illustrates electromagnetic noise that may occur during use of a touch screen panel;

DETAILED DESCRIPTION

Figure 1:
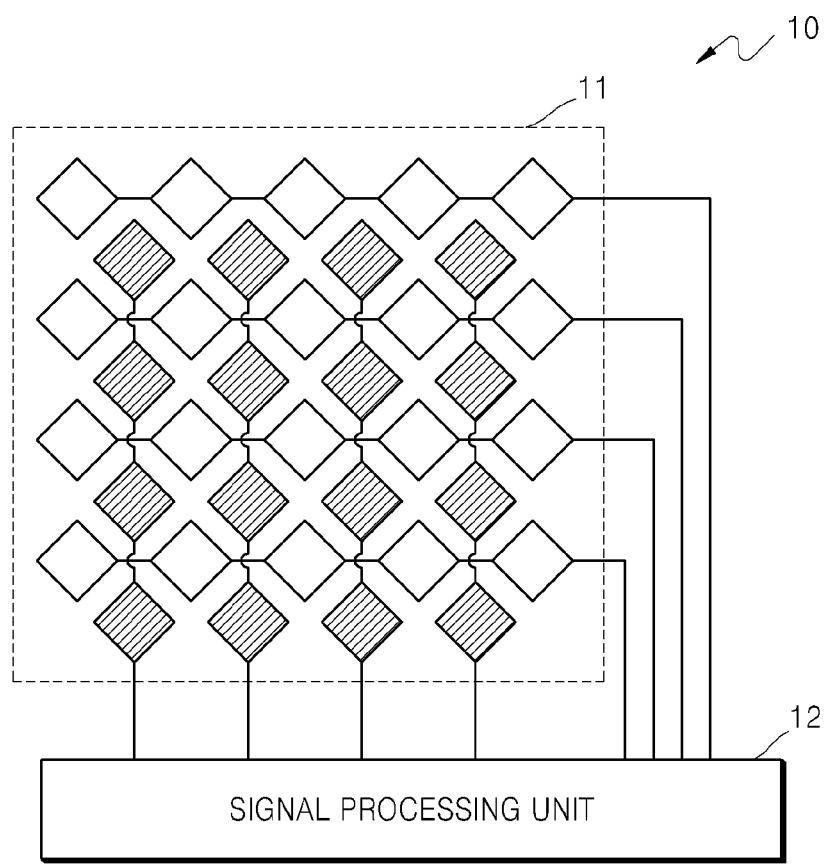
FIG. 1 illustrates a general touch screen panel and a corresponding signal processing unit processing touch signals in a touch screen system.

Reference will now be made in some additional detail to certain embodiments of the inventive concept illustrated in the accompanying drawings. However, the inventive concept should not be construed as being limited to only the illustrated embodiments. Rather, the illustrated embodiments are provided to teach the making and use of inventive concept. Throughout the written description and drawings like reference numbers and labels are used to denote like or similar elements, signals and features. In the drawings, the thicknesses of certain layers and regions may be exaggerated for clarity.

It will be understood that when an element, such as a layer, a region, or a substrate, is referred to as being "on," "connected to" or "coupled to" another element, it may be directly on, connected or coupled to the other element or intervening elements may be present. In contrast, when an element is referred to as being "directly on," "directly connected to" or "directly coupled to" another element or layer, there are no intervening elements or layers present. Like reference numerals refer to like elements throughout. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of exemplary embodiments.

Spatially relative terms, such as "above," "upper," "beneath," "below," "lower," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "above" may encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of exemplary embodiments. As used herein, the singular forms "a," "an" and "the" are intended to include the plural forms as well, unless the context clearly indicates otherwise. It will be further understood that the terms "comprises" and/or "comprising" when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which exemplary embodiments belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Figure (FIG.) 1 generally illustrates a touch screen panel and a signal processing unit processing touch signals within a touch screen system 10. Referring to FIG. 1, the touch screen system 10 includes a touch screen panel 11 including a plurality of sensing units, and a signal processing unit 12 that detects (e.g., senses and discriminates) variations in capacitance for the plurality of sensing units 11 and processes (e.g., interrupts) the detected capacitance variations to generate corresponding touch data.

The touch screen panel 11 includes a plurality of row sensing units disposed in a row direction and a plurality of column sensing units disposed in a column direction. As illustrated in FIG. 1, an arrangement of multiple rows and multiple columns form a sensing unit matrix configured to receive touch inputs. As shown, a collection of row sensing units disposed in the same row are electrically connected, and a collection of column sensing units in the same column are electrically connected.

The signal processing unit 12 generates touch data in accordance with detected variations in capacitance for the matrix of sensing units in the touch screen panel 11. The touch data may then be interrupted to identify a location for the touch input(s).

However, parasitic capacitance components are present in the matrix of sensing units of the touch screen panel 11. The parasitic capacitance components include horizontal capacitance components generated between adjacent (or proximate) sensing units, and vertical capacitance components generated between sensing units and the constituent display panel. As the overall level of parasitic capacitance increases or become relatively large, the specific variations in capacitance caused by a touch input become relatively small and harder to accurately detect. For example, as a touch mechanism comes in close proximity or contacts to a sensing unit, the capacitance of the sensing unit increases. However, when the sensing unit exhibits relatively high parasitic capacitance, the touch detection sensitivity of the sensing unit decreases. Additionally, variations in an electrode voltage VCOM supplied to the top glass of the display panel may generate sensing noise during a touch input detection operation due to a vertical parasitic capacitance.

A touch screen system using a capacitive overlay method senses the relative size of capacitances between electrode patterns of a touch mechanism and the touch screen panel. Thus, it is very significant to obtain a stable output despite the fact that the touch screen system is constantly exposed to multiple noise sources.

Figure 2:
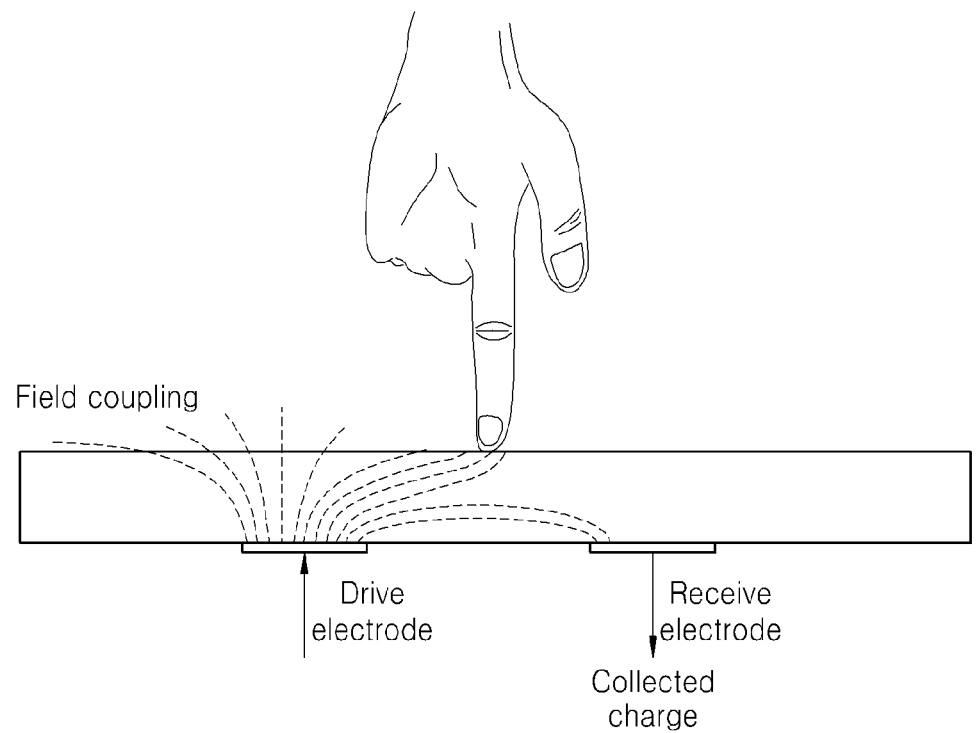
FIG. 2 illustrates a case where a touch is sensed by a touch panel using a mutual capacitive method.

FIG. 2 further illustrates a case wherein a touch input is detected via a touch screen using a mutual capacitive method. Referring to FIG. 2, consistent with the mutual capacitive method, a predetermined voltage pulse is applied to a drive electrode, and charge corresponding to the voltage pulse are collected by a receive electrode. In this regard, when a touch mechanism is interposed between the drive electrode and the receive electrode, an electrical field or multiple electrical fields (dotted lines) are created.

A touch screen system incorporating this type of touch panel detects a touch input in relation to variations in capacitance due to changes in the electrical field(s) existing between the drive and receive electrodes (e.g., field coupling effects).

FIG. 3 further illustrates electromagnetic noise that may occur during touch detection operations as performed by a touch screen panel. A portable electronic device may incorporate a touch screen panel 33 on a display panel 35 in an attempt to reduce device complexity and improve price competitiveness. For example, the combination of touch screen panel 33 and display panel 35 may be an ON-cell type touch panel. However, if the touch screen panel 33 and display panel 35 are integrated into a single body several problems may arise. For instance, parasitic capacitances Cbx and Cby generated between a sense channel of the touch screen panel 33 and a data line of the display panel 35, as well as skin accumulated noise generated by the touch mechanism (e.g., finger 31), or noise generally occurring within the touch screen system may all adversely effect performance of the ON-cell type touch panel. That is, under the accumulated noise effects, voltage fluctuations across one or more source channels applied to the display panel 35 from a display driver IC (DDI) in order to drive the display may occur. Clearly, further improvement in the performance of touch sensing system requires some approach to dealing with the presence and effects of noise. And this is particularly for portable electronic devices that tend to run at lower voltages and are generally exposed to more hostile operating environments.

Referring to FIG. 3, the touch screen panel 33 includes a plurality of sensing units arranged according to a defined x-axis and y-axis. The plurality of sensing units include X sensing lines running in the x-axis direction and Y sensing lines running in the y-axis direction. An electrical resistance $R_{ITO}$ is present between the X sensing lines and the Y sensing lines. The plurality of sensing units may be disposed adjacent to the display panel 35 or may be attached to one surface of the display panel 35. The display panel 35, as indicated in FIG. 3 by the top glass of the display panel 35, is configured to receive the electrode voltage VCOM. For example, when the top glass of the display panel 35 is an upper panel of a liquid crystal display (LCD) panel, the electrode voltage VCOM may be supplied as a common electrode voltage, and when the top glass of the display panel 35 is an upper panel of an organic light-emitting diode (OLED) panel, the electrode voltage VCOM may be supplied as a cathode voltage having a direct current (DC) voltage.

In the particular arrangement of FIG. 3, the touch screen panel 33 includes a plurality of row sensing units connected to the plurality of X sensing lines disposed in a row direction (x-direction) and a plurality of column sensing units connected to the plurality of Y sensing lines disposed in the column direction.

As previously noted, the individual sensing units are subject to certain parasitic capacitances within this arrangement. For example, each sensing unit is subjected to a horizontal parasitic capacitance component $C_{adj}$ generated between the adjacent sensing units, and vertical parasitic capacitance components Cbx and Cby generated between the sensing units and the display panel 35. When these (and other) parasitic capacitances are relatively large as compared with the capacitance components generated by a touch mechanism applied (directly or proximate) to the sensing unit, touch input detection sensitivity is adversely affected.

Figure 4A:
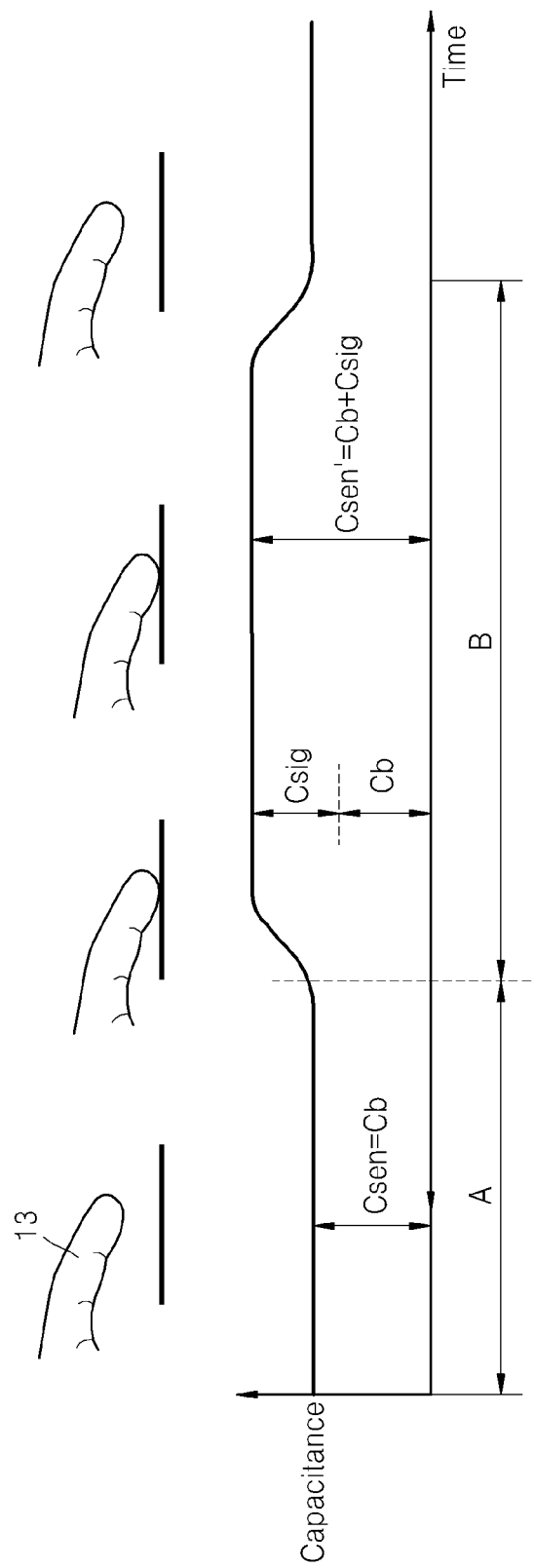
FIGS. 4A and 4B are graphs showing variation of capacitance due to a touch when noise is present in a display panel.
Figure 4B:
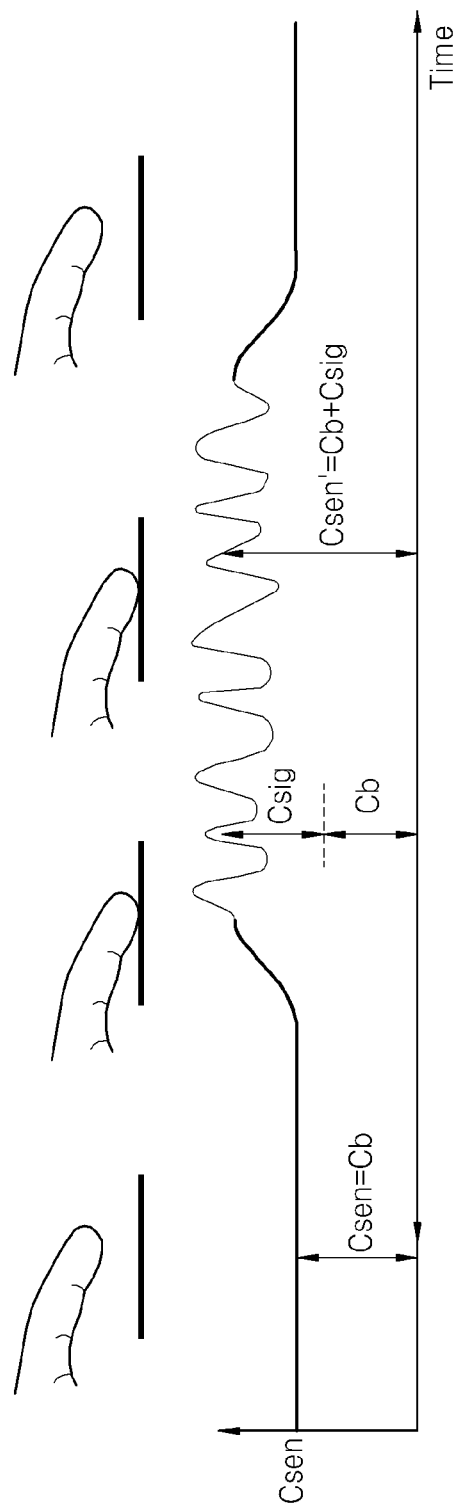

FIGS. 4A and 4B are graphs illustrating capacitance variations caused by application of a touch mechanism to a display panel in the presence of noise associated with the parasitic capacitances. Referring to FIG. 4A, each of the sensing units is assumed to have a parasitic capacitance component $C_b$. The capacitance of the sensing unit varies as a touch mechanism is applied and an additional capacitance component $C_{sig}$ is generated. The example of FIGS. 4A and 4B assumes the use of a contact type touch mechanism, but those skilled in the art will recognize that "applying" a touch mechanism to a touch screen may take many forms.

Period A of the timeline shown in FIG. 4A indicates a state wherein the touch mechanism has not yet applied to the sensing unit. During this period, the capacitance Csen of the sensing unit is merely $C_b$, which corresponds to the parasitic capacitance component. Period B of the timeline FIG. 4A indicates a state wherein the touch mechanism is applied to the sensing unit. During this period, the additional capacitance component Csig is generated between the touch mechanism (e.g., finger 13) and the touch screen panel, and the capacitance Csen of the sensing unit is increased to capacitance Csen' obtained by adding the parasitic capacitance $C_b$ and the capacitance component Csig. This is the ideal case, and under such circumstances the touch input may be readily detected.

However, as illustrated in FIG. 4B, non-ideal cases are more typical in real world environments and certain noise components may greatly affect the nature of the capacitance developed by a sensing unit. Under extremely noisy conditions, a touch input cannot be accurately detected (e.g., sensed and discriminated) due to fluctuations in the capacitance Csen' of the sensing unit.

Additional noise components may be generated when LCD panels and OLED panels are used as a touch screen. For example, when the OLED panel is used, a common electrode layer used to generate a common voltage Vcom is formed under the touch sense channel. The common electrode layer is maintained at a predetermined constant voltage using an external switching mode power supply (SMPS). Thus, where the OLED type panel is used, the noise accumulated on the touch sense channel may be quite small.

On the other hand, when the LCD panel is used, it may be driven using one of two possible methods, (i.e., a method driving a common electrode with a constant voltage or a method continuously inversing the common electrode). In both of these methods, a great deal of noise may accumulated whenever data is written via a source channel because the touch screen system is affected by slew as well as by the data signals being written via the source channel.

Figure 5:
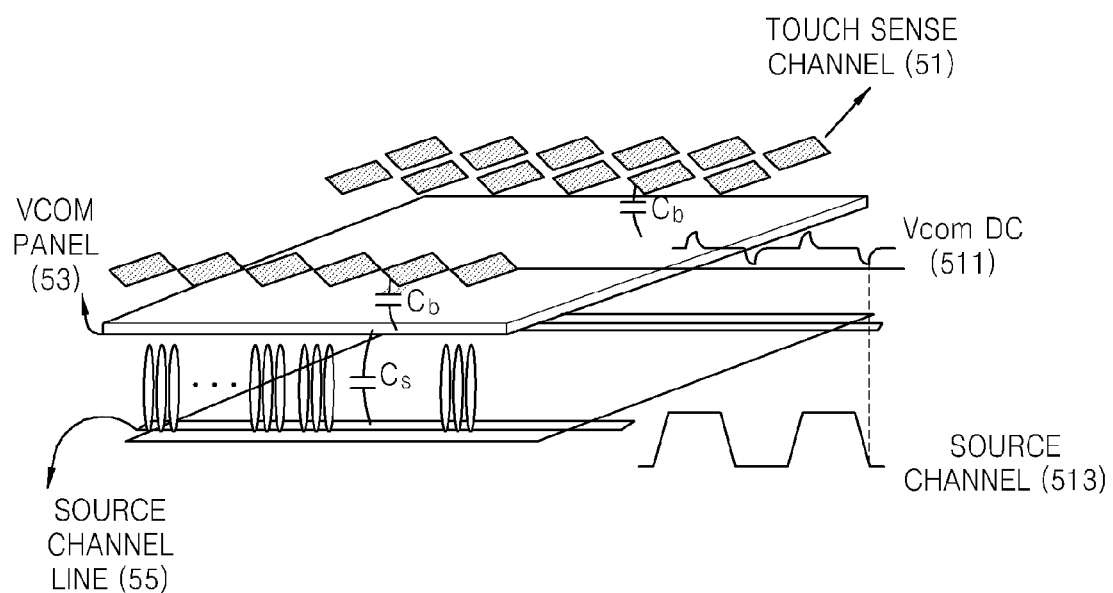
FIG. 5 further illustrates the effect of noise in a touch screen system.

FIG. 5 further illustrates the effect of noise in a touch screen system. Referring to FIG. 5, a common electrode voltage Vcom DC 511 is driven as a constant voltage DC using an active level shifter (ALS) method (one of the methods commonly used to drive the LCD panel), and a boost voltage is applied to a storage capacitor (not shown) disposed on a module. Multiple source channels 513 are disposed in an LCD qVGA grade panel. Noise is generated in the Vcom DC 511 due to signal variations of the source channels 513 disposed on a source channel line 55. A parasitic capacitance $C_s$ typically generated between the source channel 513 and a common electrode (VCOM) panel 53 is often 10 nF or more.

Also, in the case of an ON-cell type touch panel, a parasitic capacitance $C_b$ generated between the touch sense channel 51 and the VCOM panel 53 may be very large (e.g., several pF or more). Thus, when the multiple source channels 513 are simultaneously activated and data is communicated via each touch sense channel 51, noise accumulated in the touch sense channel 51 is greatly increased. On the other hand, as the parasitic capacitance $C_b$ decreases, noise accumulated in the touch sense channel 51 is greatly decreased. Also, as voltage swings across the source channels 513 increase, noise components accumulated in the VCOM panel 53 also increase. One type of circuit used to drive the common electrode VCOM is the DDI internal block, but there are distinct limitations associated with increasing the bandwidth of the DDI internal block. Thus, noise accumulated in the source channels 513 cannot be stabilized within a short time.

Figure 6A:
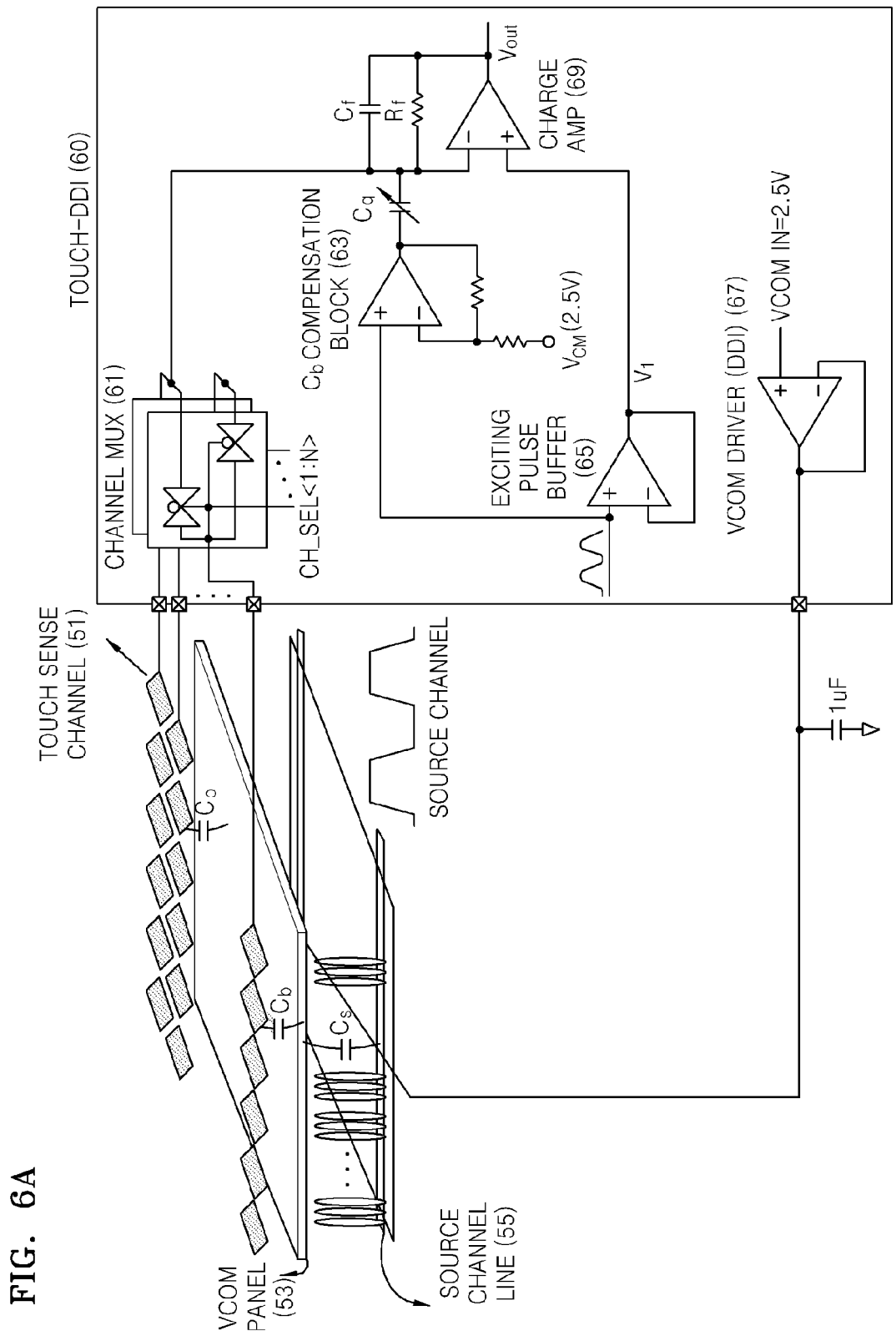
FIG. 6A illustrates one possible structure for an ON-cell type touch panel and a touch-display driver IC (DDI) arranged within a one-chip solution.

FIG. 6A illustrates one possible structure for an ON-cell type touch panel and a touch-display driver IC (DDI) 60 integrated into a one-chip solution. Referring to FIG. 6A, the touch-DDI 60 includes a channel multiplexer 61, an amplifier (e.g. a charge amplifier) 69, a parasitic capacitance ($C_b$) compensation block 63, an exciting pulse buffer 65, and a VCOM driver (DDI) 67. The touch-DDI 60 is connected to an external host controller (not shown) that may be a touch controller as well as a display driver unit (not shown). This combination of components may generally be termed a touch screen system.

The channel multiplexer 61 multiplexes the signaling effects of a touch input over one or more touch sense channel (s) 51 using a channel selector CH_SEL and outputs a resulting "sense output" signal (e.g., a multiplexed touch signal) to the charge amplifier 69.

The charge amplifier 69 detects the sense output (e.g., detects a quantity of charge generated in response to application of the touch input), and converts the detected sense output into a voltage Vout. According to one embodiment of the inventive concept, the charge amplifier 69 may be understood as one type of signal conversion unit. In the illustrated embodiment of FIG. 6A, a resistor $R_f$ and a capacitor $C_f$ are connected in parallel between an output terminal and a inverting input terminal of the charge amplifier 69. A capacitance generated in response to the touch input is generally about 1 pF and is relatively small compared with the parasitic capacitance $C_b$. The $C_b$ compensation block 63 is used to reduce the effects of the parasitic capacitance $C_b$, wherein a compensating capacitance $C_q$ is applied to compensate for the parasitic capacitance $C_b$. In the illustrated example, a pulse voltage is applied to the $C_b$ compensation block 63 and a non-inverting input terminal of the exciting pulse buffer 65. A constant voltage $V_{CM}$ is applied to an inverting input terminal of the $C_b$ compensation block 63. An output terminal $V_1$ of the exciting pulse buffer 65 is connected to the non-inverting input terminal of the charge amplifier 69.

The VCOM driver (DDI) 67 receives and buffers a common electrode voltage VCOM IN and supplies the common electrode voltage VCOM IN to the touch panel.

Figure 6B:
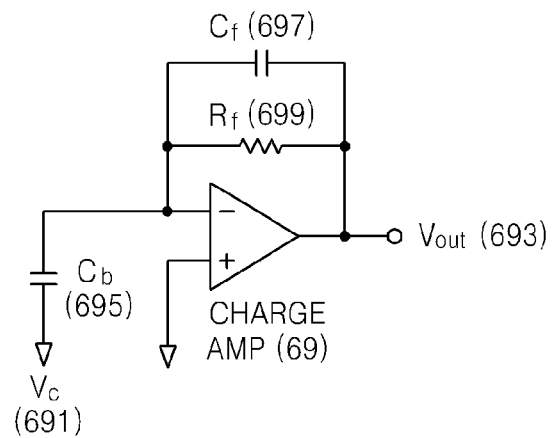
FIG. 6B is an equivalent circuit diagram of the charge amplifier of FIG. 6A and further illustrates the effect of display noise accumulated at a common electrode panel.

FIG. 6B is an equivalent (and simplified) circuit diagram for the charge amplifier 69 of FIG. 6A and further illustrates the effects resulting from display noise accumulated in a common electrode panel. According to certain embodiments of the inventive concept, the charge amplifier 69 functions as a signal conversion unit.

Peripheral circuits and corresponding parasitic resistive and capacitive components are not shown in FIG. 6B. A noise source accumulated in the VCOM panel 53 when one is selected from a plurality of touch sense channels is indicate as $V_c$ 691. A transfer function from the noise source $V_c$ 691 to the output terminal of the charge amplifier 69 may be approximated by Equation 1:

$$V_{out} = -\frac{sC_b R_f}{1 + sC_f R_f} V_c. \quad (1)$$

In Equation 1, the value of a resistor $R_f$ 699 is assumed to be very large (e.g., several mega ohms (MΩ)). As a result, the ratio of an output voltage $V_{out}$ 694 to the noise source $V_c$ 691 may be expressed as a ratio of capacitances between capacitor $C_b$ 695 and capacitor $C_f$ 697, or as shown in Equation 2:

$$\frac{V_{out}}{V_c} = -\frac{C_b}{C_f}. \quad (2)$$

Generally, in the case of an ON-cell type touch panel, the capacitance of the capacitor $C_b$ 695 is several pF or more and thus, the gain associated with the noise is 1 or more. That is, the charge amplifier 69 increases noise accumulated in the VCOM panel 53 according to a gain caused by the capacitor $C_b$ 695 and the capacitor $C_f$ 697. This causes the output of the charge amplifier 69 to fall outside of its prescribed dynamic region and touch input detection may become substantially impaired. In order to perform touch input detection without this problem, some method reducing display noise is required.

Figure 7A:
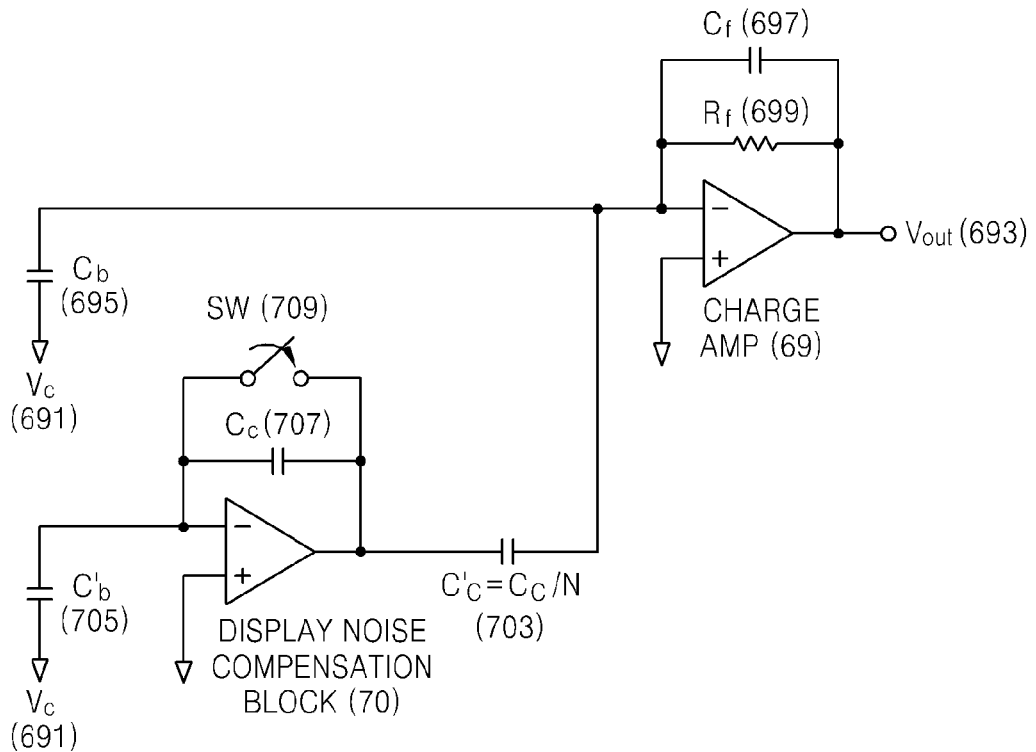
FIG. 7A is a circuit diagram of a noise compensation block and a charge amplifier combination within a touch screen system according to an embodiment of the inventive concept.

FIG. 7A is a circuit diagram of a noise compensation block and a charge amplifier combination within a touch screen system according to an embodiment of the inventive concept.

Like in FIG. 6B, a display noise source is defined as $V_c$ 691, and the display noise source $V_c$ 691 is applied to an input terminal of the charge amplifier 69. In order to compensate for noise, a quantity of charge may be generated, such as the quantity of charge corresponding to the noise accumulated when one or more sense channel(s) is "affected" by a touch input. In this context, the term "affected" generally describes a changed electrical change (e.g., a change in capacitance) that occurs when a touch input is applied to a sense channel. In this context, more than one sense channel may be simultaneously affected by application of a touch input. During application of a touch input, a number of sense channels may be said to be affected by the touch input, while other sense channels will remain unaffected. Different approaches may be taken to the detection and discrimination of a touch input in determining whether a particular sense channel is affected or unaffected.

Continuing with the example illustrated in FIG. 7A, a parasitic capacitance $C_{b'}$ 705 generated between the one or more sense channel(s) and the VCOM panel may be formed when N peripheral channels are simultaneously selected. The quantity of charge generated in relation to the parasitic capacitance $C_{b'}$ 705 is much larger than the quantity of charge generated in relation to the detected capacitance $C_b$ 695 since several channels are simultaneously selected. In the working example illustrated in FIG. 7A, the display noise compensation block 70 may be regarded as a kind of charge amplifier having a gain of $C_{b'}/C_c$ where $C_c$ 707 is defined by a compensation feedback capacitor.

When all channels are assumed to have the same parasitic capacitance $C_b$ and the $C_c$ 707 is set to the same value as the capacitance of the capacitor $C_b$ 695, an output of the display noise compensation block 70 may be increased to $(C_b/C_c)V_c$, (i.e., $N*V_c$) When the voltage is applied to a noise compensation capacitor $C_{c'}$ will be equal to $C_c/N$ 703, and the quantity of charge generated by the noise compensation capacitor under the condition $C_{c'}=C_c/N$ 703 will be $(C_b/N)V_c$.

As shown in Equation 3, when the average of the capacitances for capacitor $C_b$ 695 and capacitor $C_{b'}$ 705 is small, the effects of the display noise source $V_c$ 691 essentially disappear.

$$V_{out} = -\frac{R_f}{1 + sC_f R_f} \times s\left(C_b - \frac{C_{b'}}{N}\right)V_c \quad (3)$$

$$\text{If } C_b = \frac{C_{b'}}{N} \text{ then } \frac{V_{out}}{V_c} = 0.$$

For initial biasing, a gain reset switch 709 connected in parallel to an output of an inverting input terminal of the display noise compensation block 70 may be provided. The noise compensation capacitor $C_{c'}=C_c/N$ 703 used to compensate for noise is included in an output terminal of the display noise block 70.

Since there is a high probability that the parasitic capacitances of touch sense channels are different from one another, when several channels are used in this manner, an average display noise may be reduced without notable effects caused by the differences between channels.

Figure 7B:
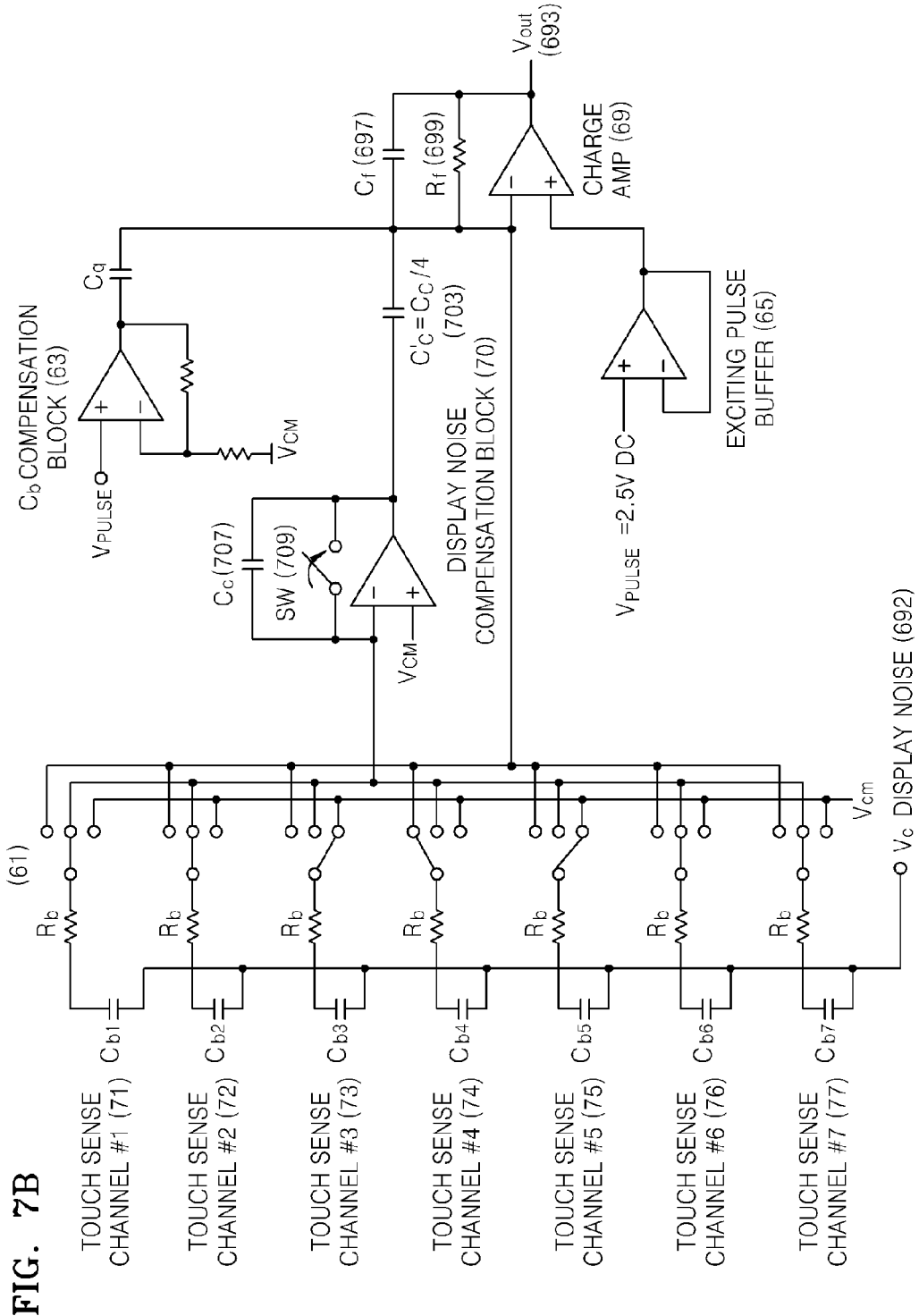
FIG. 7B is a circuit diagram more specifically illustrating an approach wherein four sense channels are used to accomplish noise compensation within an embodiment of the inventive concept.

FIG. 7B is a circuit diagram further illustrating a method wherein four sense channels (an arbitrary example) engage on in noise compensation according to an embodiment of the inventive concept. Referring to FIG. 7B, a total of seven touch sense channels 71 through 77 are arbitrarily assumed in the illustrated example. Among these, four touch sense channels 71, 72, 76, and 77 engage in noise compensation as sensed channels disposed around a touched sense channel, wherein a touch input is not sensed in the four touch sense channels 71, 72, 76, and 77. Stated in other terms, the four touch sense channels 71, 72, 76, and 77 are unaffected sense channels bracketing three affected sense channels 73, 74 and 75. Thus, the illustrated example of FIG. 7B assumes that the region of the touch screen receiving a touch input exceeds one pixel and encompasses or "affects" three sense channels. In certain embodiment in order to provide smoother noise compensation, a sense channel directly adjacent to a sense channel affected by an applied touch input may not be used for noise compensation purposes, but instead the constant voltage $V_{CM}$ may be applied as illustrated in FIG. 7B.

Referring still to FIG. 7B, it is assumed that there are two sense channels to which the constant voltage $V_{CM}$ is applied in an axial direction. However, this is merely another arbitrarily selected example, and there may be four sense channels to which the constant voltage $V_{CM}$ is applied, etc. In this regard in certain embodiments, the number of sense channels to which the constant voltage $V_{CM}$ is applied, will be the same as the number of sense channels in the axial direction of affected sense channels. Display noise is indicated in the example of FIG. 7B by $V_c$ 692.

Referring still to FIG. 7B, the sense channel #4 74 is connected to the inverting input terminal of the charge amplifier 69 in order to sense charge generated in a capacitor $C_{b4}$ due application of a touch input. In left/right (or upper/lower) channels #3 73 and #5 75 adjacent to the sense channel #4 74, charge may also be generated in capacitors $C_{b3}$ and $C_{b5}$ due to application of the touch input. Thus in certain embodiments, the sense channels #3 73 and #5 75 may not used to compensate for the display noise, but instead the constant voltage VCM may be applied, as described above.

Now, the unaffected sense channels #1 71, #2 72, #6 76, and #7 77, excluding affected sense channels #3 73, #4 74, and #5 75, may be connected to the display noise compensation block 70 via the channel multiplexer 61. In this regard, the channel multiplexer 61 may be an analog multiplexer.

An exciting pulse $V_{PULSE}$ is fixed as a constant voltage only for display noise compensation. The quantity of charge generated in the capacitor $C_{b4}$ of the touch sense channel #4 74 may be expressed by the Equation 4:

$$\Delta Q_{t4} = C_{b4} \times \Delta V_c. \quad (4)$$

In order to perform DC biasing on the output terminal of the display noise compensation block 70, the gain reset switch 709 is turned ON and OFF simultaneously while starting a compensation operation. The quantity of charge transferred to the compensation feedback capacitor $C_c$ 707 of the display noise compensation block 70 is $\Delta Q_t$ and may be regarded as the quantity of charge of the noise stimulated in four touch sense channels.

Due to variations in output voltages of the display noise compensation block 70, the quantity of charge generated in the noise compensation capacitor $C_{c'} = C_c/N$ 703 is $\Delta Q_{c'}$, expressed in a form in which an average of parasitic capacitances of the four unaffected sense channels #1 71, #2 72, #6 76, and #7 77 is multiplied by display noise. As a result, when the value of the capacitor $C_{b4}$ of the touch sense channel is the same as the average of the parasitic capacitances of the four unaffected sense channels #1 71, #2 72, #6 76, and #7 77, $\Delta Q_t$ and $\Delta Q_{c'}$ become identical.

$$\Delta Q_{c'} = \frac{C_c}{4} \Delta V_c = -\frac{C_{b1} + C_{b2} + C_{b6} + C_{b7}}{4} \Delta V_c \quad (5)$$

$$\text{if } C_{b4} = \frac{C_{b1} + C_{b2} + C_{b6} + C_{b7}}{4},$$

$$\Delta Q_{t4} = \Delta Q_{c'}.$$

Thus, the same quantity of charge associated with the noise is compensated for, such that the display noise is reduced. A system using a touch controller including a display noise compensation block or a display noise compensation circuit is useful when a display panel and a touch panel are integrated into a single body, and may be used even in an overlay type touch screen system as well as an ON-cell type touch screen system.

Figure 8:
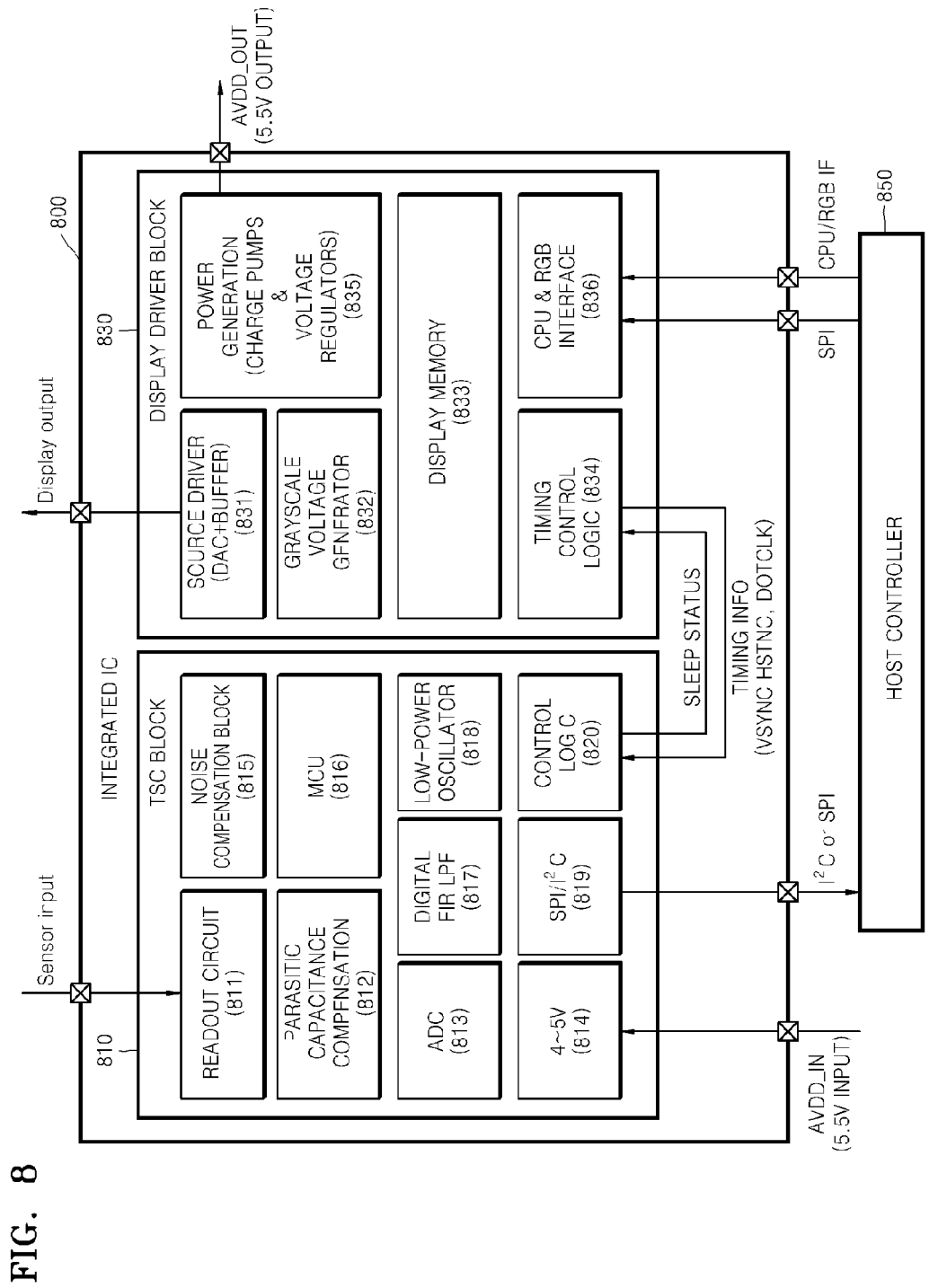
FIG. 8 is a block diagram of a single integrated circuit (IC) (or single chip) incorporating a touch controller and a display driver circuit according to an embodiment of the inventive concept.

FIG. 8 is a block diagram of an integrated circuit (IC) 800 in which a touch controller and a display driver circuit are integrated in a single IC chip according to an embodiment of the inventive concept. Referring to FIG. 8, the IC 800 includes a touch controller unit 810 that operates as a touch controller and performs display noise compensation, and a display driver unit 830 that operates as a display driver circuit. By integrating the touch controller unit 810 and the display driver unit 830 into a single IC, production costs may be reduced.

The touch controller unit 810 may include various elements for performing operations of a touch screen. For example, the touch controller 810 may include a readout circuit 811 for generating touch data, a parasitic capacitance compensation unit 812 for reducing parasitic capacitance components of a sensing unit, an analog to digital converter (ADC) 813 for converting analog data into a digital signal, a power supply voltage generation unit 814 for generating a power supply voltage, a noise compensation block 815 for compensating for display noise, a multipoint control unit (MCU) 816, a digital finite impulse response (FIR) filter 817, an oscillator 818 for generating a low power oscillation signal, an interface unit 819 for transmitting and receiving signals to and from a host controller 850, a control logic unit 820, and a memory (not shown). Also, the display driver unit 830 may include a source driver 831 for generating gray scale data for display operations, a gray scale voltage generator 832, and a memory 833 for storing display data. The display driver unit 830 may include a timing control logic unit 834 and a power generation unit 835 for generating at least one power supply voltage, if necessary. Also, the display driver unit 830 may include a CPU and interface unit 836 for controlling the overall operation of the display driver unit 830 or for performing an interface function with the host controller 850.

The display driver unit 830 may receive at least one piece of information from the touch controller unit 810. For example, the display driver unit 830 may receive a status signal, e.g., a sleep status signal, from the touch controller unit 810, as illustrated in FIG. 8.

Also, as illustrated in FIG. 8, each of the touch controller unit 810 and the display driver unit 830 includes a circuit block for generating power, a memory for storing predetermined data, and a control unit for controlling the function of each block. As such, when the touch controller unit 810 and the display driver unit 830 are integrated in one semiconductor chip, the memory, the power generation unit 835, and the control unit may be commonly used in the touch controller unit 810 and the display driver unit 830.

FIGS. 9A through 9D illustrate a structure of a printed circuit board (PCB) of a display device 900 on which a touch panel 920 is disposed according to an embodiment of the inventive concept. In FIGS. 9A through 9D, a display device having a structure in which the touch panel 920 and the display panel 940 are separated from each other is illustrated.

Figure 9A:
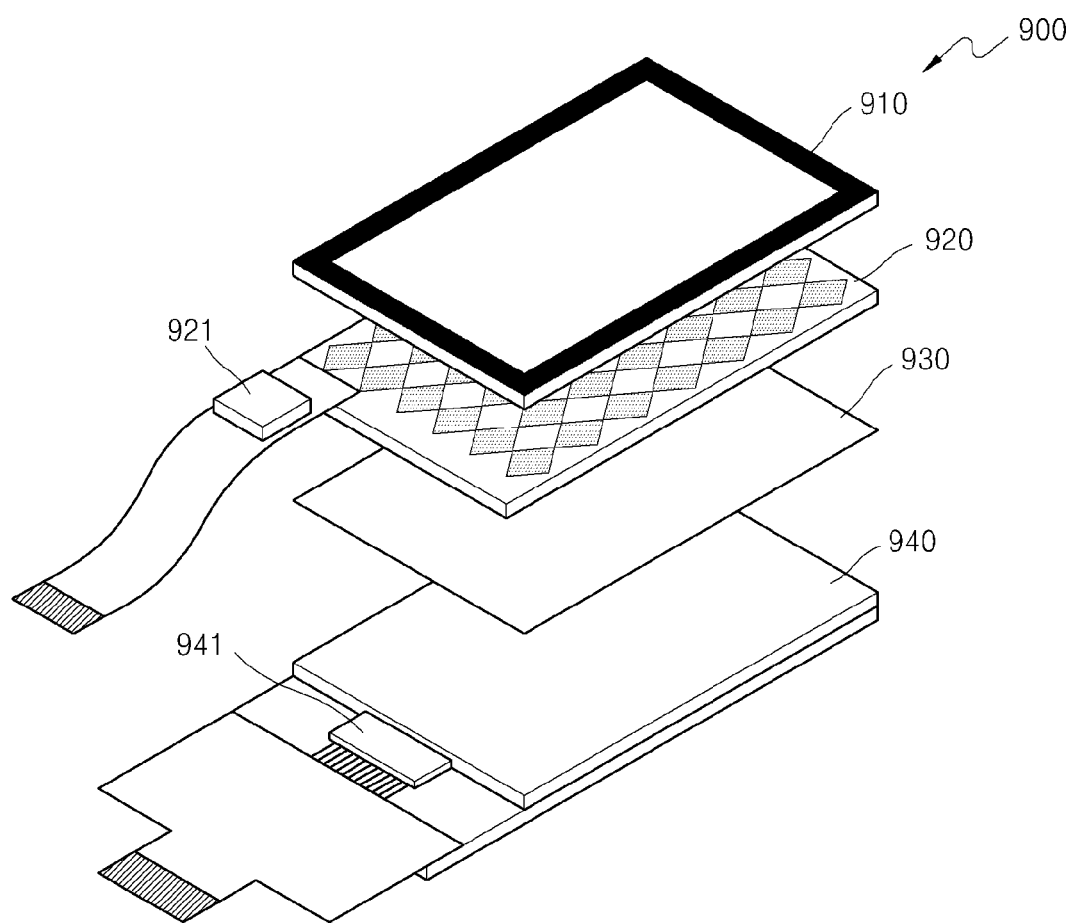
FIGS. 9A through 9D illustrate one possible structure for a printed circuit board (PCB) of a display device on which a touch panel is disposed according to an embodiment of the inventive concept.

Referring to FIG. 9A, the display device 900 includes a window glass 910, the touch panel 920, and display panel 940. Also, a polarizer 930 may be further disposed between the touch panel 920 and the display panel 940 to provide desired optical characteristics.

The window glass 910 may be manufactured from one or more material(s), such as acryl, tempered glass, or the like, and should be designed to protect the module from scratches, external shocks, and/or the effects of repeated touching. The touch panel 920 is formed by patterning a transparent electrode, such as an indium tin oxide (ITO), on a glass substrate or a polyethylene terephthlate (PET) film. A touch screen controller 921 may be mounted on a flexible printed circuit board (FPCB) in the form of a chip on board (COB), senses a variation in capacitances from each electrode, extracts touch coordinates, and provides the touch coordinates to a host controller. The display panel 940 is generally formed by bonding two pieces of glass that constitute a top glass and a bottom glass of the display panel 940. Also, a display driver circuit 941 is attached to a display panel for a cell phone in the form of chip on glass (COG).

Figure 9B:
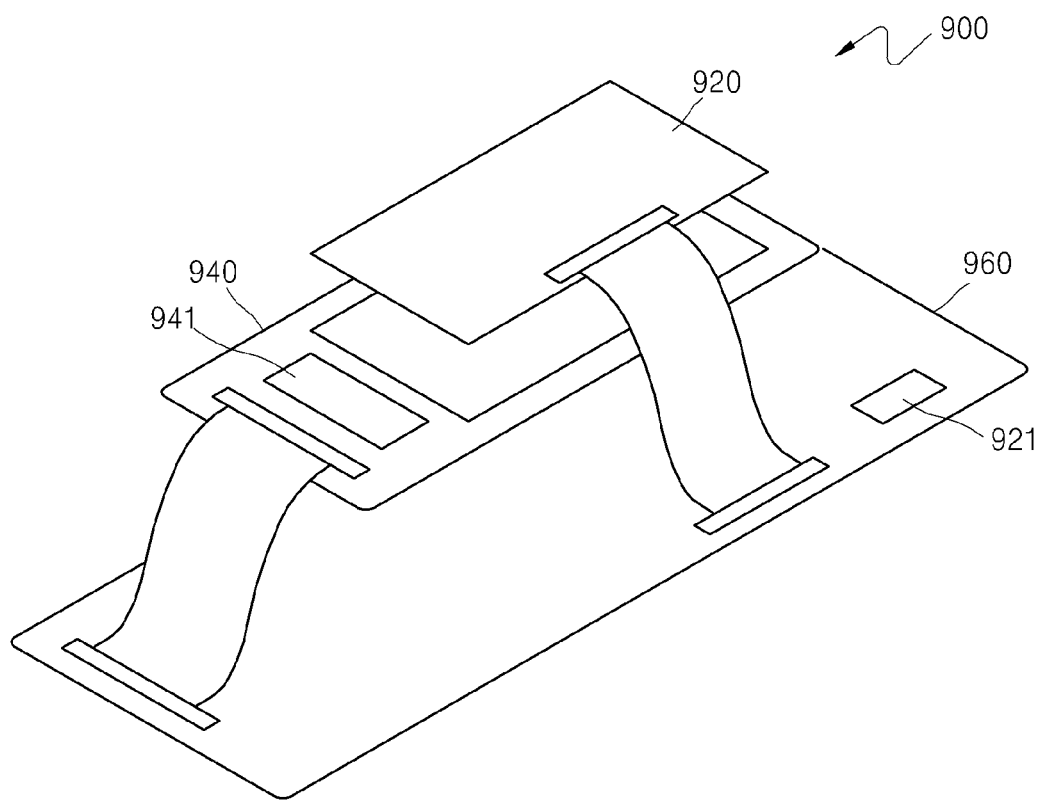

FIG. 9B illustrates an example of a structure of another PCB of the display device 900 of FIG. 9A. Referring to FIG. 9B, the touch screen controller 921 may be disposed on a main board 960, and voltage signals may be transmitted from and received by a sensing unit disposed between the touch panel 920 and the touch screen controller 921 via a FPCB. On the other hand, the display driver circuit 941 may be attached in the form of the COG, as illustrated in FIG. 9A. The display driver circuit 941 may be connected to the main board 960 via the FPCB. In detail, the touch screen controller 921 and the display driver unit 941 may transmit and receive various information and signals to and from the main board 960.

Figure 9C:
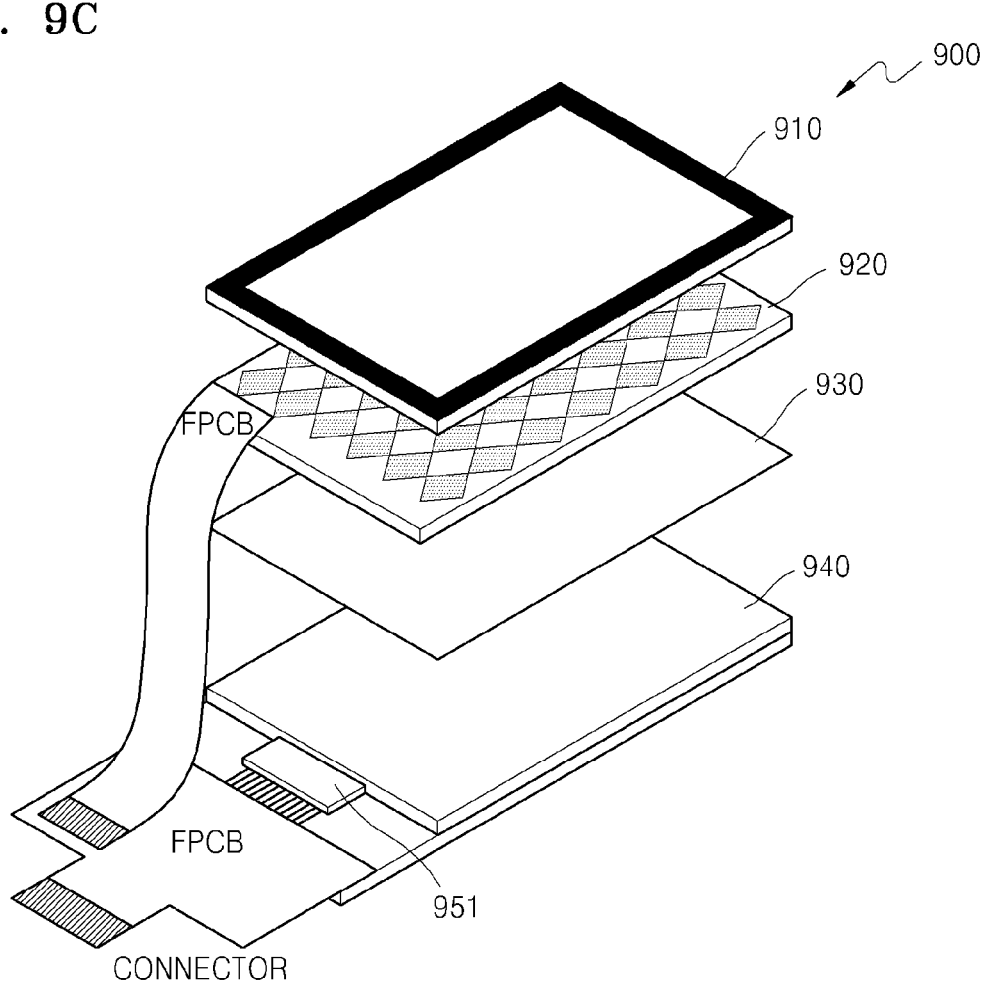

FIG. 9C illustrates a structure of the display device 900 when the touch screen controller unit 921 and the display driver unit 941 are integrated in one semiconductor chip 951. Referring to FIG. 9C, the display device 900 may include a window glass 910, a touch panel 920, a polarizer 931, and a display panel 940. In particular, the semiconductor chip 951 may be attached to the display panel 940 in the form of the COG. The touch panel 920 and the semiconductor chip 951 may be electrically connected to each other via a FPCB.

Figure 9D:
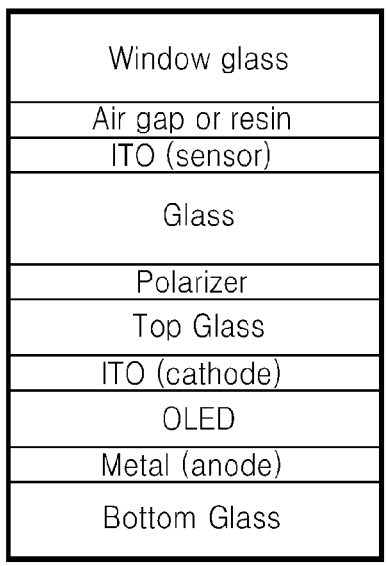

FIG. 9D illustrates a structure of a panel of the display device 900 illustrated in FIGS. 9A, 9B, and 9C. FIG. 9D illustrates an OLED as a display device. Referring to FIG. 9D, a sensing unit may be formed by patterning a transparent electrode ITO (sensor) and may be formed on an additional glass separated from a display panel. The glass substrate on which the sensing unit is formed may be separated from a window glass due to a predetermined air gap or resin and may also be separated from the top glass and the bottom glass that constitute the display panel based on the polarizer 931.

Figure 10A:
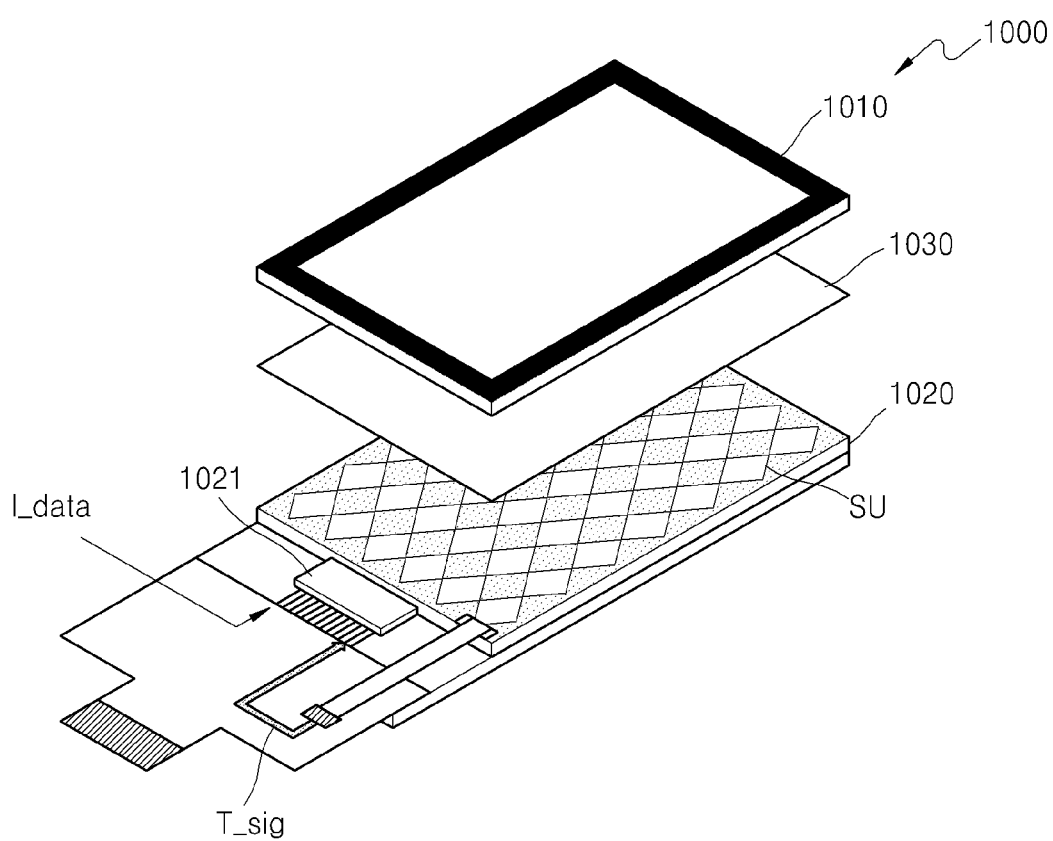
FIGS. 10A through 10D illustrate another structure for a PCB wherein the touch panel and display panel are integrated into a single body.

FIGS. 10A through 10D illustrate a structure of a PCB when a touch panel and a display panel are integrated with each other as one body. Referring to FIG. 10A, a display device 1000 may include a window glass 1010, a display panel 1020, and a polarizer 1030. In particular, when the touch panel is realized, the touch panel is not formed on an additional glass substrate but may be formed by patterning transparent electrodes on a top glass of the display panel 1020. FIG. 10A illustrates an example in which a plurality of sensing units SU are disposed on the top glass of the display panel 1020. Also, when the structure of the PCB is constituted in this manner, one semiconductor chip 1021 in which a touch controller unit and a display driver unit are integrated may be used.

When the touch controller unit and the display driver unit are integrated in one semiconductor chip 1021, a voltage signal T_sig from the sensing unit SU and image data I_data from an external host are provided to the semiconductor chip 1021. Also, the semiconductor chip 1021 processes the image data I_data, generates gray scale data (not shown) for driving the display device 1000, and provides the gray scale data to the display panel 1020. To this end, the semiconductor chip 1021 may include a pad related to touch data T_data and a pad related to the image data I_data and the gray scale data (not shown). The semiconductor chip 1021 receives the voltage signal T_sig from the sensing unit SU via a conductive line connected to one side of the touch panel.

When the pads are disposed on the semiconductor chip 1021, the pad for receiving the voltage signal T_sig may be disposed adjacent to the conductive line for transferring the voltage signal T_sig (while noise in the data is being reduced. Although not shown in FIG. 10A, when the conductive line for providing the gray scale data to the display panel 1020 is on an opposite side to the side of a conductive line for transferring the voltage signal T_sig of the touch data T_data, the pad for providing the gray scale data may be disposed on an opposite side to the side of the pad for receiving the voltage signal T_sig.

Figure 10B:
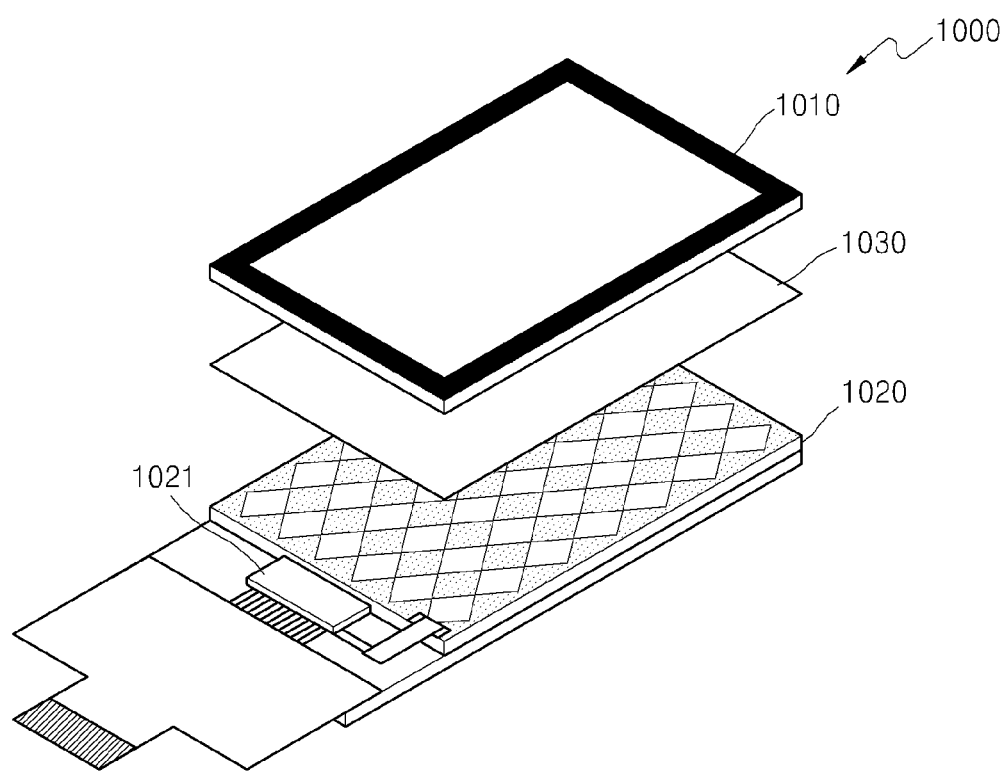

FIG. 10B has a substantially similar structure to that of the display device 1000 of FIG. 10A and illustrates an example in which a voltage signal from a sensing unit is not provided to the semiconductor chip 1021 via the FPCB but is directly provided to the semiconductor chip 1021 via a conductive line. Also, a display device 1000 of FIG. 10C has a substantially similar structure to that of the display device 1000 of FIG. 10A, or a path of the display device 1000 of FIG. 10C on which the voltage signal from the sensing unit is transferred to the semiconductor chip 1021 is different from that of the display device 1000 of FIG. 10A. In this case, among the pads disposed on the semiconductor chip 1021, the pad for receiving the voltage signal from the sensing unit is disposed relatively close to the conductive line.

Figure 10C:
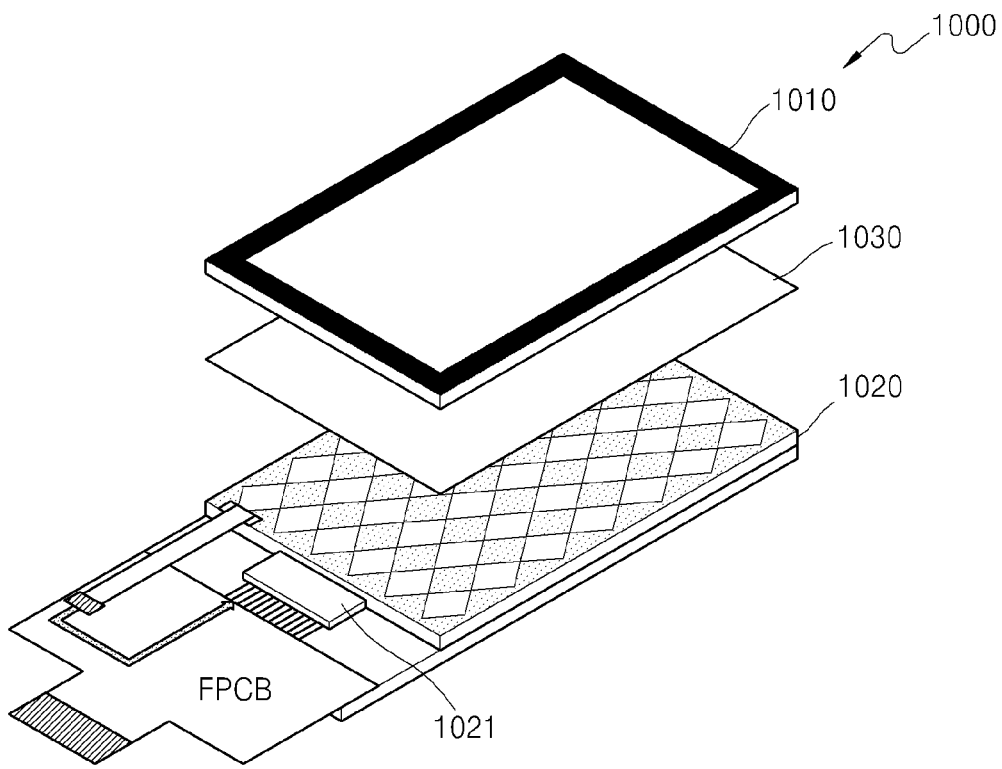
Figure 10D:
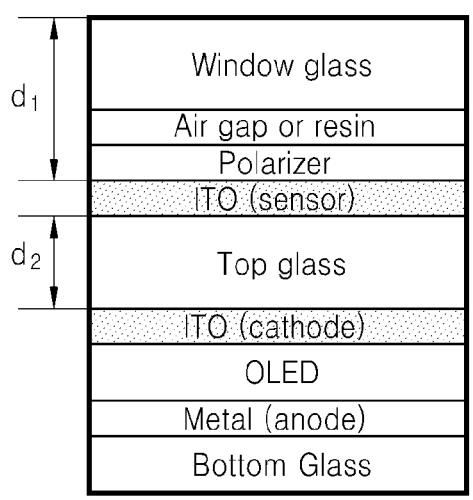

FIG. 10D illustrates a structure of a panel of the display devices 1000 illustrated in FIGS. 10A, 10B, and 10C. In the display device 1000 of FIGS. 10A, 10B, and 10C, the touch panel and the display panel can be efficiently integrated with each other as one body. FIG. 10D illustrates an OLED as a display device. A transparent electrode ITO (sensor) is not formed on an additional glass substrate or a PET film but may be directly formed on the top glass of the display panel, as illustrated in FIG. 10D. In this case, when the touch display panel is realized, production costs and the thickness of a module can be reduced. However, as a distance between the transparent electrode ITO (sensor) and the top glass of the display panel is decreased, vertical parasitic capacitance components of the sensing unit increase. However, by reducing an effect caused by the entire parasitic capacitance components including the vertical parasitic capacitance components of the sensing unit by using an appropriate method, the touch panel and the display panel can be efficiently integrated with each other as one body.

Figure 11A:
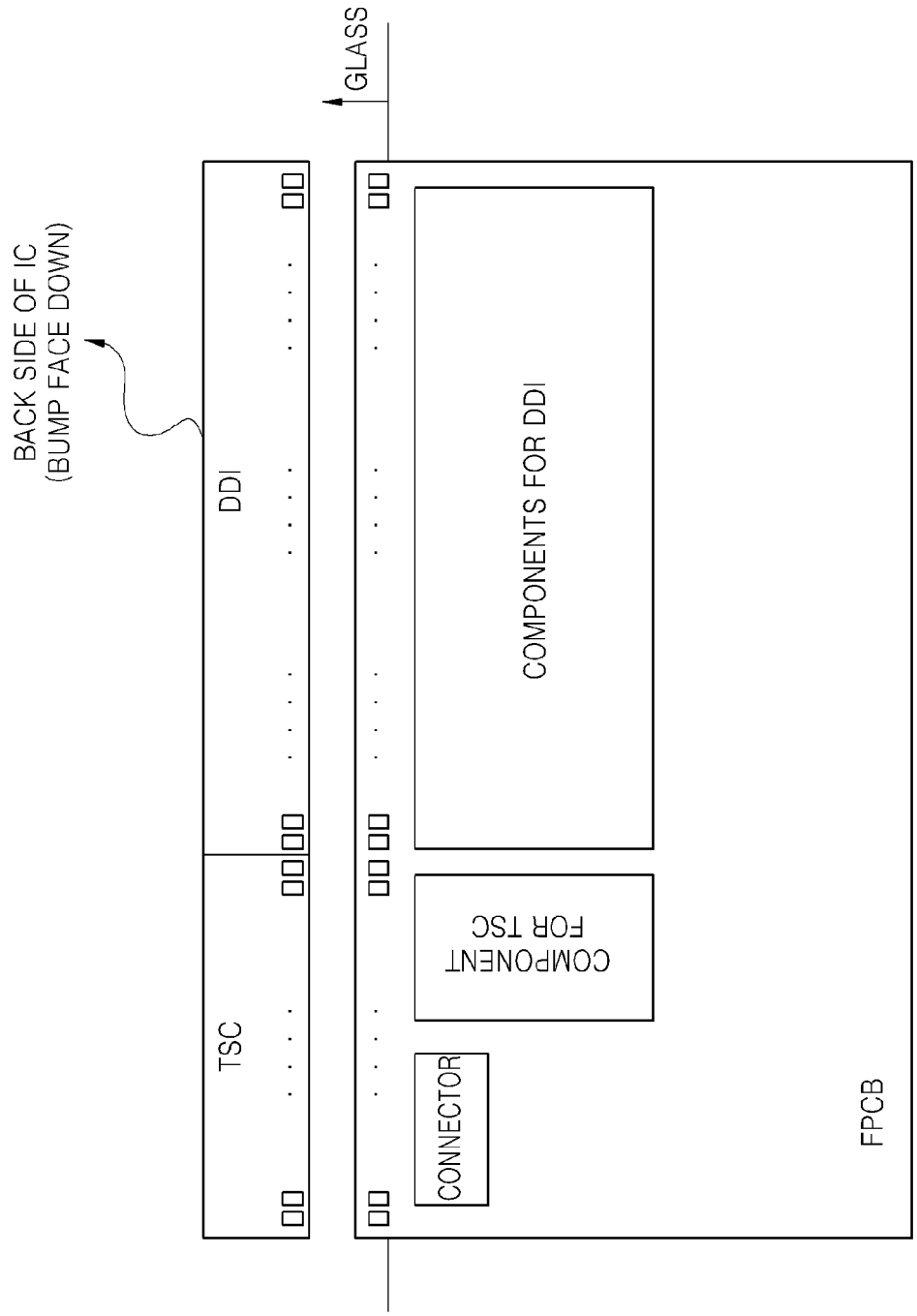
FIGS. 11A and 11B illustrate possible layout structures for a semiconductor chip in which a touch controller unit and display driver circuit are integrated upon a flexible PCB (FPCB)
Figure 11B:
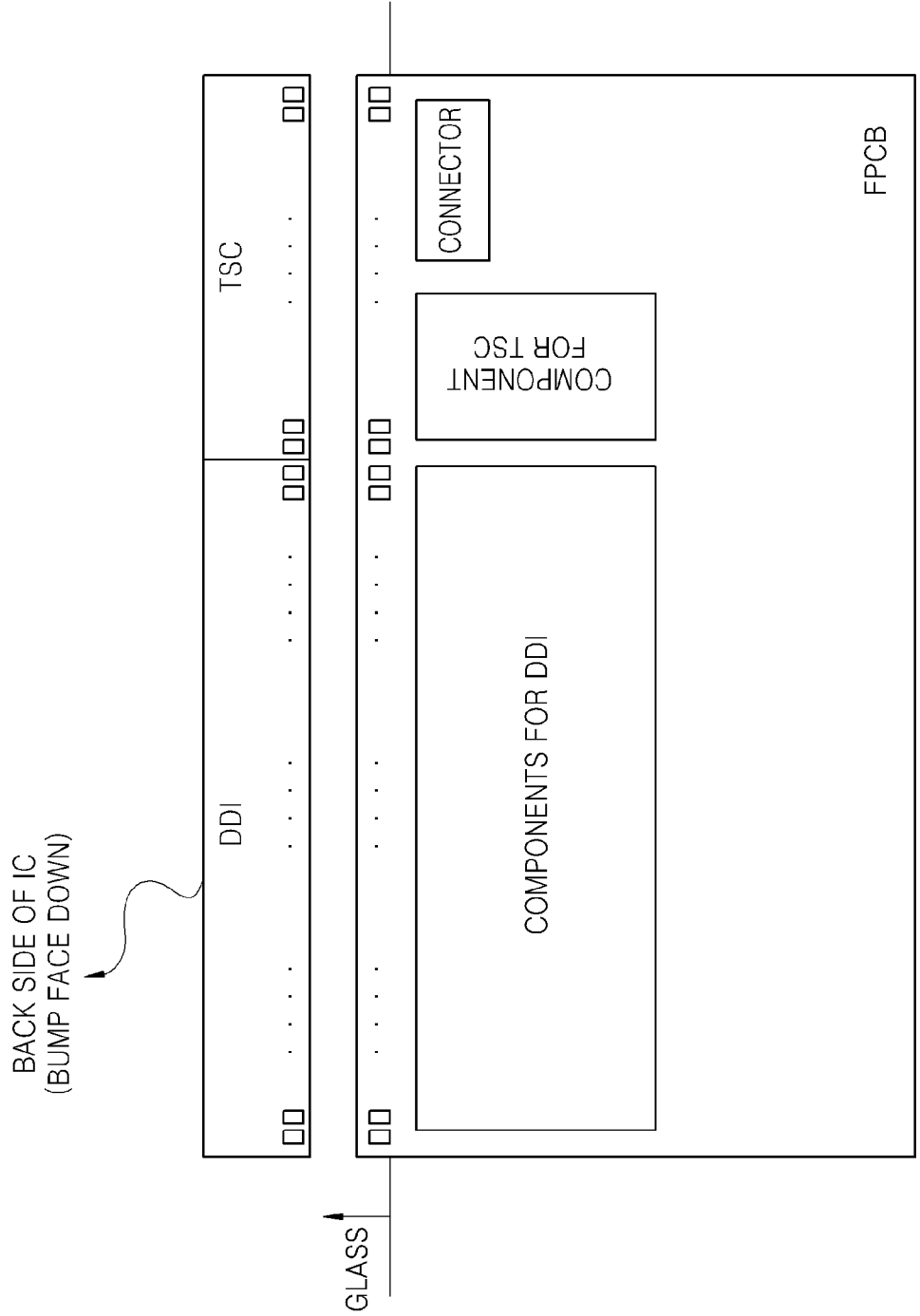

FIGS. 11A and 11B illustrate a possible layout structure for the semiconductor chip in which the touch controller unit and the display driver circuit are integrated, as well as the structure of a corresponding FPCB. The semiconductor chip includes pads for transmitting and receiving signals related to the touch controller unit, and pads for transmitting and receiving signals related to the display driver circuit. The pads may be electrically connected to an external touch panel, a display panel, a host controller, or the like via a connection terminal of the FPCB. When the semiconductor chip is realized, a region in which the touch controller unit is disposed and a region in which the display driver circuit is disposed may be separated from each other. When the connection terminal is disposed on the FPCB, a connection terminal connected to the signals related to the touch controller unit and a connection terminal connected to the signals related to the display driver circuit may be separated from each other, so as to correspond to the pads of the semiconductor chip.

Figure 12:
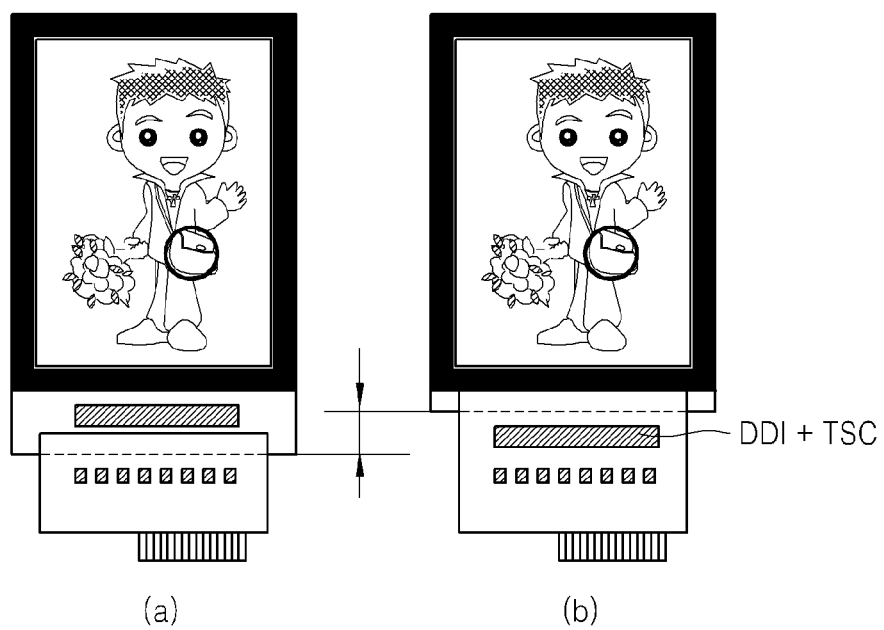
FIG. 12 illustrates a display device including a semiconductor chip in which a touch controller and a display driver circuit are integrated according to an embodiment of the inventive concept.

FIG. 12, inclusive of FIGS. 12(a) and 12(b), illustrates a display device including a semiconductor chip in which a touch controller unit and a display driver circuit are integrated according to an embodiment of the inventive concept. FIG. 12(a) illustrates an example in which the semiconductor chip is disposed on the glass of a display panel in the form of a COG, and FIG. 12(b) illustrates an example in which the semiconductor chip is disposed on a film of the display panel in the form of a chip on film (COF).

When the touch controller unit and the display driver circuit are disposed on separate chips, the touch controller unit will usually be disposed in the form of the COF, and the display driver circuit may be usually disposed in the form of the COG. However, semiconductor chips in which the touch controller unit and the display driver circuit are integrated, as illustrated in FIG. 12, may be disposed in either form of the COG and COF.

Figure 13:
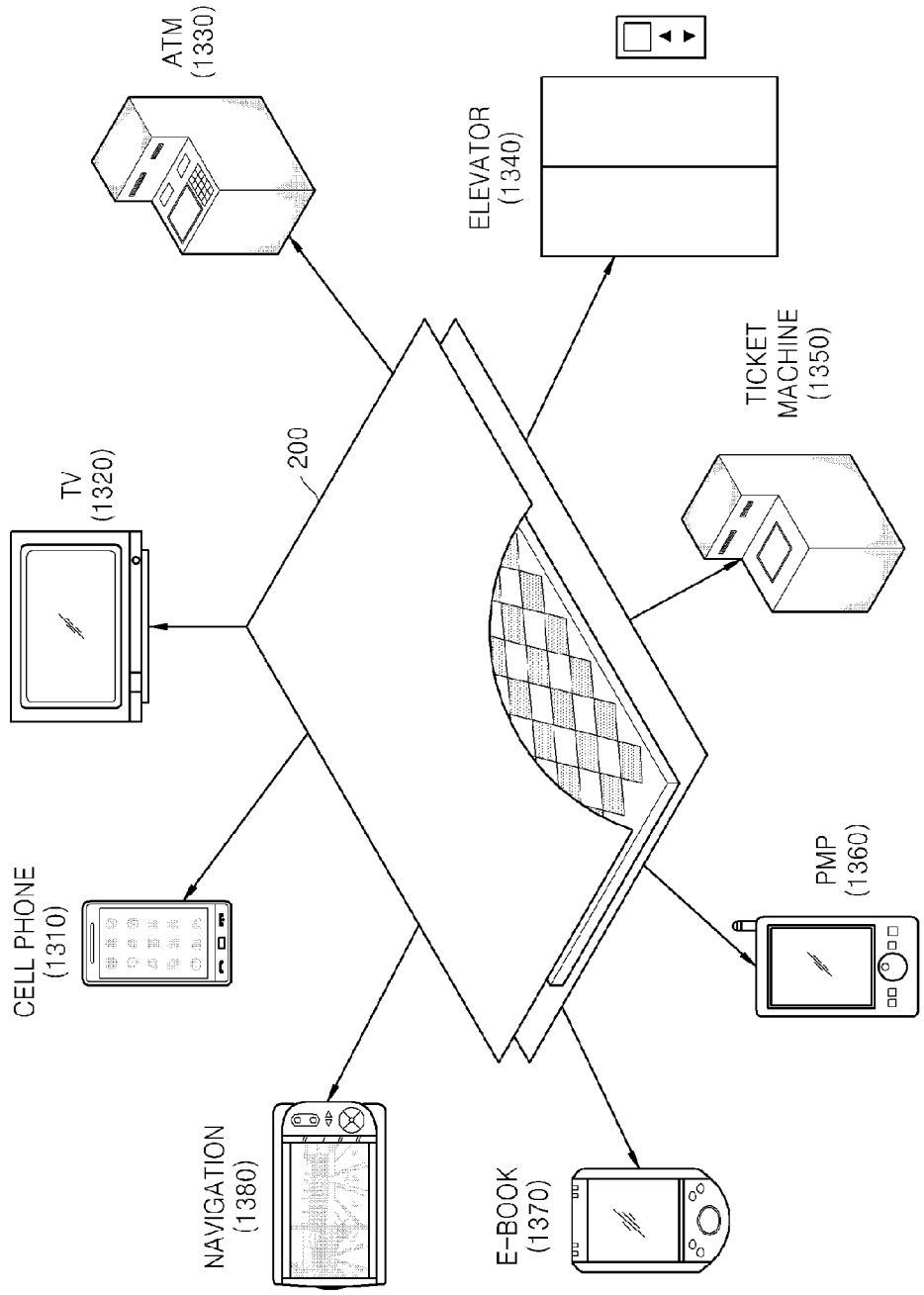
FIG. 13 illustrates various application examples wherein various electronic devices incorporate a touch screen system according to an embodiment of the inventive concept.

FIG. 13 variously illustrates application examples incorporating one or more apparatuses according to embodiments of the inventive concept. Touch screen type products are widely used in various fields of industry and are rapidly replacing button type devices due to their superior spatial characteristics. The most explosive demand is in the field of cell phones. In particular, in cell phones, convenience and the size of a terminal are very significant and thus, touch phones that do not include additional keys or minimize the number of keys have recently come into the spotlight. Thus, a touch screen system 1300 according to the current embodiment of the inventive concept can be employed in a cell phone 1310 and can also be widely used in a television (TV) 1320 including a touch screen, an asynchronous transfer mode (ATM) device 1330 that automatically serves cash withdrawal and remittance of a bank, an elevator 1340, a ticket machine 1350 used in a subway, a portable multimedia player (PMP) 1360, an e-book 1370, a navigation device 1380, and the like. Besides, the touch display device replaces a general button type interface in all fields that require a user interface.

Different embodiments of the inventive concept may be implemented as a method, an apparatus, and/or a system. When embodiments of the inventive concept are implemented, wholly or in part, using software certain components may be implemented using code segments executing an essential work or providing corresponding functionality. Programs or code segments may be stored in a processor readable storage media.

While the inventive concept has been particularly shown and described with reference to exemplary embodiments thereof, it will be understood that various changes in form and details may be made therein without departing from the scope of the following claims.

What is claimed is:

1. An apparatus compensating noise in a touch screen system, the apparatus comprising:
   a touch screen panel including sense channels providing a sense output corresponding to a capacitance variation associated with a touch input applied to a group of affected sense channels among the sense channels, wherein a parasitic capacitance is accumulated as the touch input is applied to the group of affected sense channels, and the sense channels further include unaffected sense channels to which the touch input is not applied; and
   a touch controller receiving the sense output and comprising:
      a noise compensation block that receives a compensating input from a channel multiplexer connecting unaffected channels, and is configured to generate a compensation capacitance to compensate for the parasitic capacitance in response to the compensating input to provide a compensation output; and
      a signal conversion unit that receives the compensation output from the noise compensation block and directly receives a portion of the sense output from one of the group of affected sense channels while the compensating input is received by the noise compensation block, and is configured to generate a noise compensated sense output in response to the portion of the sense output and the compensation output.

2. The apparatus of claim 1, wherein the noise compensation block comprises:
   an amplifier having a gain reset switch disposed between an inverting input and an output of the amplifier, wherein the compensating input is applied to the inverting input;
   a compensation feedback capacitor connected in parallel with the gain reset switch; and
   a noise compensation capacitor disposed between the output of the amplifier and a first input of the signal conversion unit, wherein the first input of the signal conversion unit directly receives the portion of the sense output together with the compensation output.

3. The apparatus of claim 2, wherein the unaffected sense channels include;
   first unaffected sense channels disposed in one direction from the group of affected sense channels; and
   second unaffected sense channels disposed in another direction from the group of affected sense channels.

4. The apparatus of claim 3, wherein while the compensating input is received by the noise compensation block and while the portion of the sense output is received by the signal conversion unit, a constant voltage is applied to at least one of the group of affected sense channels.

5. The apparatus of claim 4, wherein the at least one of the group of affected sense channels receiving the constant voltage is a sense channel directly adjacent to the one of the group of affected sense channels providing the portion of the sense output directly to the first input of the signal conversion unit.

6. The apparatus of claim 2, wherein a capacitance of the compensation feedback capacitor is substantially the same as a parasitic capacitance between at least one of the sensing channels and a common electrode.

7. The apparatus of claim 6, wherein a capacitance of the noise compensation capacitor is substantially the same as a capacitance obtained by dividing the capacitance of the compensation feedback capacitor by a number of the unaffected sense channels.

8. The apparatus of claim 2, wherein the channel multiplexer connects the unaffected sense channels to the inverting input of the amplifier.

9. The apparatus of claim 2, wherein the touch screen panel and touch controller are integrated into a single body.

10. The apparatus of claim 9, wherein the touch screen panel is an ON-cell type touch panel.

11. The apparatus of claim 1, wherein the touch screen panel is an overlay touch panel.

12. A method compensating noise in a touch screen system including a touch screen panel and a signal processing unit, wherein the touch screen panel comprises sense channels providing a sense output in response to a touch input, the method comprising:
   sensing a capacitance variation associated with the touch input applied to a group of affected sense channel among the sense channels, wherein a parasitic capacitance is accumulated as the touch input is applied to the group of affected sense channels;
   generating in a noise compensation block a compensating capacitance to compensate for the parasitic capacitance in response to a compensating input received from a channel multiplexer connecting unaffected sense channels among the sense channels, and generating a compensation output corresponding in response to the compensating capacitance; and
   converting a portion of the sense output directly applied to a signal conversion unit from one of the group of affected sense channels while the compensating input is received from the channel multiplexer into a noise compensated sense output in response to the compensation output.

13. The method of claim 12, wherein generating the compensation capacitance comprises:
   while receiving the compensating input from the channel multiplexer at an inverting input of an amplifier in the noise compensation block, applying a constant voltage to a non-inverting input of the amplifier;
   applying a compensation feedback capacitance across the amplifier;
   turning ON and OFF a gain reset switch connected across the amplifier in parallel with the compensation feedback capacitance when the touch input is applied to the group of affected sense channels to generate a noise compensation block output; and passing the noise compensation block output through a noise compensation capacitor disposed between the output of the amplifier and a first input of the signal conversion unit to generate the compensation output, wherein the first input of the signal conversion unit directly receives the portion of the sense output together with the compensation output.

14. The method of claim 13, wherein the group of unaffected sense channels comprises;

first unaffected sense channels disposed in one direction from the group of affected sense channels; and second unaffected sense channels disposed in another direction from the group of unaffected sense channels.

15. The method of claim 14, further comprising:

applying a constant voltage to at least one of the group of affected sense channels while the compensating input is received from the channel multiplexer at the inverting input of an amplifier in the noise compensation block.

16. The method of claim 15, wherein the at least one of the group of affected sense channels receiving the constant voltage is a sense channel directly adjacent to the one of the group of affected sense channels applying the portion of the sense output directly to the signal conversion unit.

17. The method of claim 13, wherein the compensation feedback capacitance is substantially the same as a parasitic capacitance between at least one of the sensing channels and a common electrode.

18. The method of claim 17, wherein the noise compensation capacitor has a capacitance substantially the same as a value obtained by dividing the compensation feedback capacitance by a number of the unaffected sense channels.

19. The method of claim 13, wherein the channel multiplexer connects the unaffected sense channels to the inverting input of the amplifier.

20. A touch controller receiving a sense output provided by sense channels sensing a capacitance variation associated with an applied touch input as detected by one or more sensing units connected to the sense channels, wherein a parasitic capacitance is accumulated as the touch input is applied, the touch controller comprising:

a noise compensation block that receives a compensating input from a first group of channels among the sense channels, and is configured to generate a compensation capacitance to compensate for the parasitic capacitance in response to the compensating input and provide a compensation output; and a charge amplifier configured to receive the compensation output from the noise compensation block and directly receive a portion of the sense output from one of the second group of channels among the sense channels and generate a noise compensated sense output in response to the portion of the sense output and the compensation output.

* * * * *